(12) United States Patent
Lin et al.

(10) Patent No.: US 12,474,849 B2
(45) Date of Patent: Nov. 18, 2025

(54) SYSTEMS AND METHODS FOR EFFICIENT CONSOLIDATION OF RECORD BLOCKS

(71) Applicant: Kinaxis Inc., Ottawa (CA)

(72) Inventors: Angela Lin, Ottawa (CA); Marin Creanga, Ottawa (CA); Dylan Ellicott, Ottawa (CA)

(73) Assignee: Kinaxis Inc., Ottawa (CA)

( * ) Notice: Subject to any disclaimer, the term of this patent is extended or adjusted under 35 U.S.C. 154(b) by 191 days.

(21) Appl. No.: 18/088,168

(22) Filed: Dec. 23, 2022

(65) Prior Publication Data

US 2023/0129353 A1  Apr. 27, 2023

Related U.S. Application Data

(63) Continuation-in-part of application No. 17/897,881, filed on Aug. 29, 2022, now Pat. No. 12,367,189.

(60) Provisional application No. 63/238,348, filed on Aug. 30, 2021.

(51) Int. Cl.
*G06F 7/00* (2006.01)
*G06F 3/06* (2006.01)

(52) U.S. Cl.
CPC ............ *G06F 3/064* (2013.01); *G06F 3/0608* (2013.01); *G06F 3/0652* (2013.01); *G06F 3/0674* (2013.01)

(58) Field of Classification Search
CPC ...... G06F 3/064; G06F 3/0608; G06F 3/0652; G06F 3/0674; G06F 16/2386
USPC ....... 707/610, 623, 634, 638, 648, 703, 803, 707/999.202, 999.008, 607, 662, 705, 707/759, 781, E17.005, 999.009; 711/103, 104, 203, 112, E12.008, 711/E12.009; 713/178, 193, 167, 189, 713/150, 165, 194
See application file for complete search history.

(56) References Cited

U.S. PATENT DOCUMENTS

| 4,648,036 A | 3/1987 | Gallant |
|---|---|---|
| 5,551,046 A | 8/1996 | Mohan et al. |
| 5,884,307 A | 3/1999 | Depledge et al. |
| 6,535,869 B1 | 3/2003 | Housel, III |
| 6,606,626 B1 | 8/2003 | Ponnekanti |
| 7,765,211 B2 | 7/2010 | Bhattacharjee et al. |

(Continued)

OTHER PUBLICATIONS

U.S. Appl. No. 17/897,881, Final Office Action dated Jun. 21, 2024.
(Continued)

*Primary Examiner* — Md I Uddin
(74) *Attorney, Agent, or Firm* — Ruggiero McAllister & McMahon LLC

(57) ABSTRACT

Systems and methods for efficient consolidation of record blocks in a data base. The system comprises: 1) a deletion record set; an in-memory database representation comprising: tables and records; one or more exclusive locks for the records; and a record block index; 2) a persistent database representation comprising: record blocks; and a transaction log. The method comprises: receiving, by a processor, a deletion record set; acquiring, by the processor, an exclusive lock for one or more records in the deletion record set; consolidating, by the processor, one or more record blocks; updating, by the processor, an in-memory record block index; and adding, by the processor, a transaction log entry for the updated record block index update.

18 Claims, 31 Drawing Sheets

(56) References Cited

U.S. PATENT DOCUMENTS

| | | |
|---|---|---|
| 7,962,447 B2 | 6/2011 | Chen et al. |
| 9,348,833 B2 | 5/2016 | Schreter et al. |
| 9,875,054 B2 | 1/2018 | Mshniac et al. |
| 10,133,500 B2 | 11/2018 | Vishniac et al. |
| 10,671,641 B1 * | 6/2020 | Holenstein ............ G06F 16/284 |
| 10,740,312 B1 * | 8/2020 | Mritunjai ............ G06F 16/2272 |
| 2007/0055702 A1 | 3/2007 | Fridella et al. |
| 2007/0130224 A1 * | 6/2007 | Fischer ................ G06F 16/217 |
| | | 707/999.203 |
| 2014/0317048 A1 | 10/2014 | Wang |
| 2016/0012549 A1 * | 1/2016 | Block .................... G06Q 40/12 |
| | | 705/30 |
| 2021/0096886 A1 | 4/2021 | McLachlan et al. |

OTHER PUBLICATIONS

U.S. Appl. No. 17/897,881, Non-Final office Action dated Dec. 22, 2023.

* cited by examiner

SYSTEMS AND METHODS FOR EFFICIENT CONSOLIDATION OF RECORD BLOCKS

CROSS-REFERENCE TO RELATED APPLICATIONS

This application is a continuation-in-part of U.S. Ser. No. 17/897,881 filed Aug. 29, 2022, which claims priority to U.S. Ser. No. 63/238,348 filed Aug. 30, 2021, both of which are hereby incorporated by reference in their respective entirety.

BACKGROUND

A query-based method of deleting a large number of records from a database temporarily increases the size of the database. This increase is proportional to the number of record versions being deleted. This increase can exceed the machine capacity when billions of records need to be deleted. Furthermore, such a method is slow because it adds more data to the database. Many alternative methods of bulk deleting records are also problematic since they require taking the database offline.

BRIEF SUMMARY

Disclosed herein are systems and methods that enable deletion of large numbers of records from a database quickly, without greatly increasing the size of the database, transactionally, and without taking the database offline.

A system for efficient bulk data deletion can comprise: a) a deletion record set; b) an in-memory database representation, which itself may comprise: tables and records; one or more exclusive locks for the records; and a record block index; and c) a persistent database representation, which itself can comprise: record blocks; and a transaction log.

The systems and methods disclosed herein do not add data to the database in order to complete the deletion, and thus do not exceed machine capacity.

The systems and methods disclosed herein quickly delete bulk data; they are faster than query-based deletion since the process is batch-based and can be parallelized.

The systems and methods disclosed herein delete bulk data transactionally. By making the bulk delete part of the transaction log, the database restore treats the operation as atomic.

The systems and methods disclosed herein delete bulk data without taking the database offline. The bulk delete operation can by synchronized using database locks such that the operation interleaves correctly with other live database operations.

In one aspect, a computer-implemented method is provided for bulk data deletion from a database, the method including receiving, by a processor, a deletion record set, acquiring, by the processor, an exclusive lock for one or more records in the deletion record set, deleting, by the processor, the deletion record set from an in-memory representation of the database, generating, by the processor, one or more post-delete record block sets, updating, by the processor, an in-memory record block index, writing, by the processor, the one or more post-delete record block sets to a persistent storage representation of the database, and adding, by the processor, a transaction log entry for the updated record block index update.

In the computer-implemented method, the step of deleting the deletion record set from the in-memory representation of the database, and the step of generating the one or more post-delete record block sets, can be performed in parallel.

In the computer-implemented method, the step of updating the in-memory record block index can be performed in parallel with the steps of writing the one or more post-delete record block sets and adding the transaction log entry.

The computer-implemented method may also include, when generating the one or more post-delete record block sets: initializing, by the processor, a list of post-delete record block sets to empty, selecting, by the processor, an unprocessed table from the database, selecting, by the processor, an unprocessed version from the selected table, generating, by the processor, a post-delete record block set for the selected table and the selected version, and adding, by the processor, the post-delete record block set for the selected table, and selected version to the list of post-delete record block sets.

The computer-implemented method may also include, when updating the in-memory record block index: selecting, by the processor, an unprocessed version, selecting, by the processor, an unprocessed table associated with the unprocessed version, replacing, by the processor, the record block for the selected table and the selected version with the post-delete record blocks for the selected table and the selected version. Other technical features may be readily apparent to one skilled in the art from the following figures, descriptions, and claims.

In one aspect, a system includes a processor. The system also includes a memory storing instructions that, when executed by the processor, configure the system to receive, by a processor, a deletion record set, acquire, by the processor, an exclusive lock for one or more records in the deletion record set, delete, by the processor, the deletion record set from an in-memory representation of a database, generate, by the processor, one or more post-delete record block sets, update, by the processor, an in-memory record block index, write, by the processor, the one or more post-delete record block sets to a persistent storage representation of the database, and add, by the processor, a transaction log entry for the updated record block index update.

The system may also include memory storing instructions that, when executed by the processor, further configure the system to execute deletion of the deletion record set from the in-memory representation of the database, and generation of the one or more post-delete record block sets, in parallel.

The system may also include memory storing instructions that, when executed by the processor, further configure the system to execute, by the processor, updating the in-memory record block index, in parallel with writing the one or more post-delete record block sets to the persistent storage representation of the database, and adding the transaction log entry for the updated record block index update.

The system may also include, when generating the one or more post-delete record block sets, memory storing instructions that, when executed by the processor, further configure the system to initialize, by the processor, a list of post-delete record block sets to empty, select, by the processor, an unprocessed table from the database, select, by the processor, an unprocessed version from the selected table, generate, by the processor, a post-delete record block set for the selected table and the selected version, and add, by the processor, the post-delete record block set for the selected table and the selected version to the list of post-delete record block sets. When generating the post-delete record block set for the selected table and the selected version, the computer-implemented method may also include: initializing, by the processor, a per-(table, version) post-delete record block set to empty, selecting, by the processor, an unprocessed record block from a pre-delete set, the unprocessed record block containing a record to be deleted, producing, by the processor, a modified copy of the record block that omits both a record ID and a record body that corresponds to the record to be deleted, and adding, by the processor, the modified copy to the per (table, version) post-delete record block set. includes initializing, by the processor, a per-(table, version) post-delete record block set to empty, selecting, by the processor, an unprocessed record block from a pre-delete set, the unprocessed record block containing a record to be deleted, producing, by the processor, a modified copy of the record block that omits both a record ID and a record body that corresponds to the record to be deleted, and adding, by the processor, the modified copy to the per (table, version) post-delete record block set. When generating the post-delete record block set for the selected table and the selected version, the system may also include the memory storing instructions that, when executed by the processor, further configure the system to initialize, by the processor, a per-(table, version) post-delete record block set to empty, select, by the processor, an unprocessed record block from a pre-delete set, the unprocessed record block containing a record to be deleted, produce, by the processor, a modified copy of the record block that omits both a record ID and a record body that corresponds to the record to be deleted, and add, by the processor, the modified copy to the per (table, version) post-delete record block set.

The system may also include, when updating the in-memory record block index, memory storing instructions that, when executed by the processor, further configure the system to select, by the processor, an unprocessed version, select, by the processor, an unprocessed table associated with the unprocessed version, replace, by the processor, the record block for the selected table and the selected version with the post-delete record blocks for the selected table and the selected version. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to receive, by a processor, a deletion record set, acquire, by the processor, an exclusive lock for one or more records in the deletion record set, delete, by the processor, the deletion record set from an in-memory representation of a database, generate, by the processor, one or more post-delete record block sets, update, by the processor, an in-memory record block index, write, by the processor, the one or more post-delete record block sets to a persistent storage representation of the database, and add, by the processor, a transaction log entry for the updated record block index update.

The computer-readable storage medium may also include a computer-readable storage medium including instructions that when executed by a computer, further cause the computer to execute deletion of the deletion record set from the in-memory representation of the database, and generation of the one or more post-delete record block sets, in parallel.

The computer-readable storage medium may also include a computer-readable storage medium including instructions that when executed by a computer, further cause the computer to execute updating the in-memory record block index, in parallel with writing the one or more post-delete record block sets to the persistent storage representation of the database, and adding the transaction log entry for the updated record block index update.

The computer-readable storage medium may also include, when generating the one or more post-delete record block sets, a computer-readable storage medium including instructions that when executed by a computer, further cause the computer to initialize, by the processor, a list of post-delete record block sets to empty, select, by the processor, an unprocessed table from the database, select, by the processor, an unprocessed version from the selected table, generate, by the processor, a post-delete record block set for the selected table and the selected version, and add, by the processor, the post-delete record block set for the selected table, and selected version to the list of post-delete record block sets. When generating the post-delete record block set for the selected table and the selected version, the computer-readable storage medium may also include instructions that when executed by a computer, further cause the computer to initialize, by the processor, a per-(table, version) post-delete record block set to empty, select, by the processor, an unprocessed record block from a pre-delete set, the unprocessed record block containing a record to be deleted, produce, by the processor, a modified copy of the record block that omits both a record ID and a record body that corresponds to the record to be deleted, and add, by the processor, the modified copy to the per (table, version) post-delete record block set. The computer-readable storage medium may include instructions that when executed by a computer, further cause the computer to initialize, by the processor, a per-(table, version) post-delete record block set to empty, select, by the processor, an unprocessed record block from a pre-delete set, the unprocessed record block containing a record to be deleted, produce, by the processor, a modified copy of the record block that omits both a record ID and a record body that corresponds to the record to be deleted, and add, by the processor, the modified copy to the per (table, version) post-delete record block set.

The computer-readable storage medium may also include, when updating the in-memory record block index, instructions that when executed by a computer, further cause the computer to select, by the processor, an unprocessed version, select, by the processor, an unprocessed table associated with the unprocessed version, replace, by the processor, the record block for the selected table and the selected version with the post-delete record blocks for the selected table and the selected version. Other technical features may be readily apparent to one skilled in the art from the following figures, descriptions, and claims.

In one aspect, a computer-implemented method is provided for efficient consolidation of record blocks in a database, the method including receiving, by a processor, a deletion record set, acquiring, by the processor, an exclusive lock for one or more records in the deletion record set, consolidating, by the processor, one or more record blocks, updating, by the processor, an in-memory record block index, and adding, by the processor, a transaction log entry for an updated record block index update.

The computer-implemented method may also include performing in parallel the steps of consolidating, by the processor, the one or more record blocks, and updating, by the processor, the in-memory record block index.

The computer-implemented method may also include, with respect to consolidating the one or more record blocks, receiving, by the processor, the deletion record set and a set of record blocks, each record block includes a set of records updating, by the processor, a list of records to keep, when processing each record in each set of record blocks, writing, by the processor, one or more new record blocks to a disk after processing each record in each set of record blocks, and updating, by the processor, an in-memory database.

The computer-implemented method may also include, with respect to updating the list of records to keep, receiving, by the processor, a current record and the deletion record set. Updating the list of records to keep may also include, where a record ID of the current record is not in the list of records to keep, adding, by the processor, the current record to the list of records to keep. Updating the list of records to keep may also include, where a record ID of the current record is not in the list of records to keep and where the record ID of the current record is in the list of records to keep, retrieving, by the processor, an existing record with a record ID that is identical to the record ID of the current record, from the list of records to keep. Updating the list of records to keep may also include, where a record ID of the current record is not in the list of records to keep and where the record ID of the current record is in the list of records to keep where the current record replaces the existing record according to a replacement criteria, deleting, by the processor, the existing record from the list of records to keep, and adding, by the processor, the current record to the list of records to keep.

The computer-implemented method may also include, with respect to the replacement criteria, comparing a time stamp of the current record with a time stamp of the existing record.

The computer-implemented method may also include, with respect to writing the one or more new record blocks to the disk, containing, by the processor, each record block in the list of records to keep to one record block, or containing, by the processor, each record block in the list of records to keep to a plurality of record blocks.

Other technical features may be readily apparent to one skilled in the art from the following figures, descriptions, and claims.

In one aspect, a system includes a processor. The system also includes a memory storing instructions that, when executed by the processor, configure the system to receive, by the processor, a deletion record set, acquire, by the processor, an exclusive lock for one or more records in the deletion record set, consolidate, by the processor, one or more record blocks, update, by the processor, an in-memory record block index, and add, by the processor, a transaction log entry for an updated record block index update.

The system may also include a memory storing the instructions that, when executed by the processor, further configure the system to consolidate, by the processor, the one or more record blocks, and update, by the processor, the in-memory record block index, in parallel.

The system may also include, with respect to consolidating the one or more record blocks, a memory storing the instructions that, when executed by the processor, further configure the system to receive, by the processor, the deletion record set and a set of record blocks, each record block includes a set of records update, by the processor, a list of records to keep, when processing each record in each set of record blocks, write, by the processor, one or more new record blocks to disk after processing each record in each set of record blocks, and update, by the processor, an in-memory database.

The system may also include, with respect to updating the list of records to keep, a memory storing the instructions that, when executed by the processor, further configure the system to receive, by the processor, a current record and the deletion record set. Updating the list of records to keep may also include, where a record ID of the current record is not in the list of records to keep, adding, by the processor, the current record to the list of records to keep. Updating the list of records to keep may also include, where a record ID of the current record is not in the list of records to keep and where the record ID of the current record is in the list of records to keep, retrieving, by the processor, an existing record with a record ID that is identical to the record ID of the current record, from the list of records to keep. Updating the list of records to keep may also include, where a record ID of the current record is not in the list of records to keep and where the record ID of the current record is in the list of records to keep where the current record replaces the existing record according to a replacement criteria, deleting, by the processor, the existing record from the list of records to keep, and add, by the processor, the current record to the list of records to keep.

The system may also include, with respect to the replacement criteria, comparing a time stamp of the current record with a time stamp of the existing record.

The system may also include, with respect to writing the one or more new record blocks to the disk, a memory storing the instructions that, when executed by the processor, further configure the system to contain, by the processor, each record block in the list of records to keep to one record block, or contain, by the processor, each record block in the list of records to keep to a plurality of record blocks.

Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to receive, by a processor, a deletion record set, acquire, by the processor, an exclusive lock for one or more records in the deletion record set, consolidate, by the processor, one or more record blocks, update, by the processor, an in-memory record block index, and add, by the processor, a transaction log entry for an updated record block index update.

The computer-readable storage medium may also include instructions that when executed by a computer, further cause the computer to consolidate, by the processor, the one or more record blocks, and update, by the processor, the in-memory record block index, in parallel.

The computer-readable storage medium may also include, with respect to consolidating the one or more record blocks, instructions that when executed by the computer, further cause the computer to receive, by the processor, the deletion record set and a set of record blocks, each record block includes a set of records update, by the processor, a list of records to keep, when processing each record in each set of record blocks, write, by the processor, one or more new record blocks to disk after processing each record in each set of record blocks, and update, by the processor, an in-memory database.

The computer-readable storage medium may also include, with respect to updating the list of records to keep, instructions that when executed by the computer, further cause the computer to receive, by the processor, a current record and the deletion record set. Updating the list of records to keep may also include, where a record ID of the current record is not in the list of records to keep, adding, by the processor, the current record to the list of records to keep. Updating the list of records to keep may also include, where a record ID of the current record is not in the list of records to keep and where the record ID of the current record is in the list of records to keep, retrieving, by the processor, an existing record with a record ID that is identical to the record ID of the current record, from the list of records to keep. Updating the list of records to keep may also include, where a record ID of the current record is not in the list of records to keep and where the record ID of the current record is in the list of records to keep where the current record replaces the existing record according to a replacement criteria, deleting, by the processor, the existing record from the list of records to keep, and adding, by the processor, the current record to the list of records to keep.

The computer-readable storage medium may also include, with respect to the replacement criteria, instructions that when executed by the computer, further cause the computer to compare a time stamp of the current record with a time stamp of the existing record.

The computer-readable storage medium may also include, with respect to writing the one or more new record blocks to the disk, instructions that when executed by the computer, further cause the computer to contain, by the processor, each record block in the list of records to keep to one record block, or contain, by the processor, each record block in the list of records to keep to a plurality of record blocks. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

DETAILED DESCRIPTION

Figure 1:
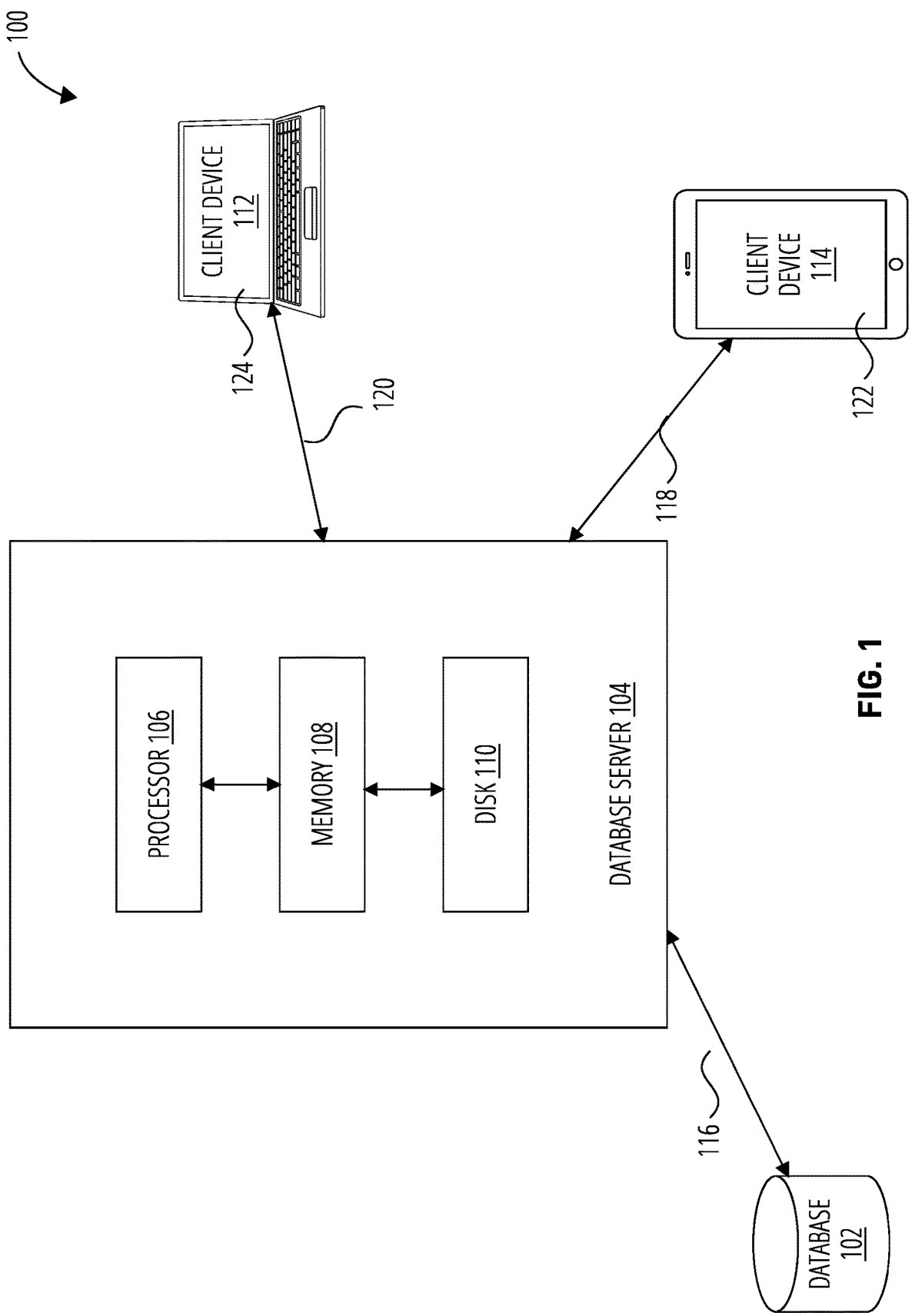
FIG. 1 illustrates a system for efficient bulk data deletion in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1 illustrates a system 100 for efficient bulk data deletion in accordance with one embodiment.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Figure 2:
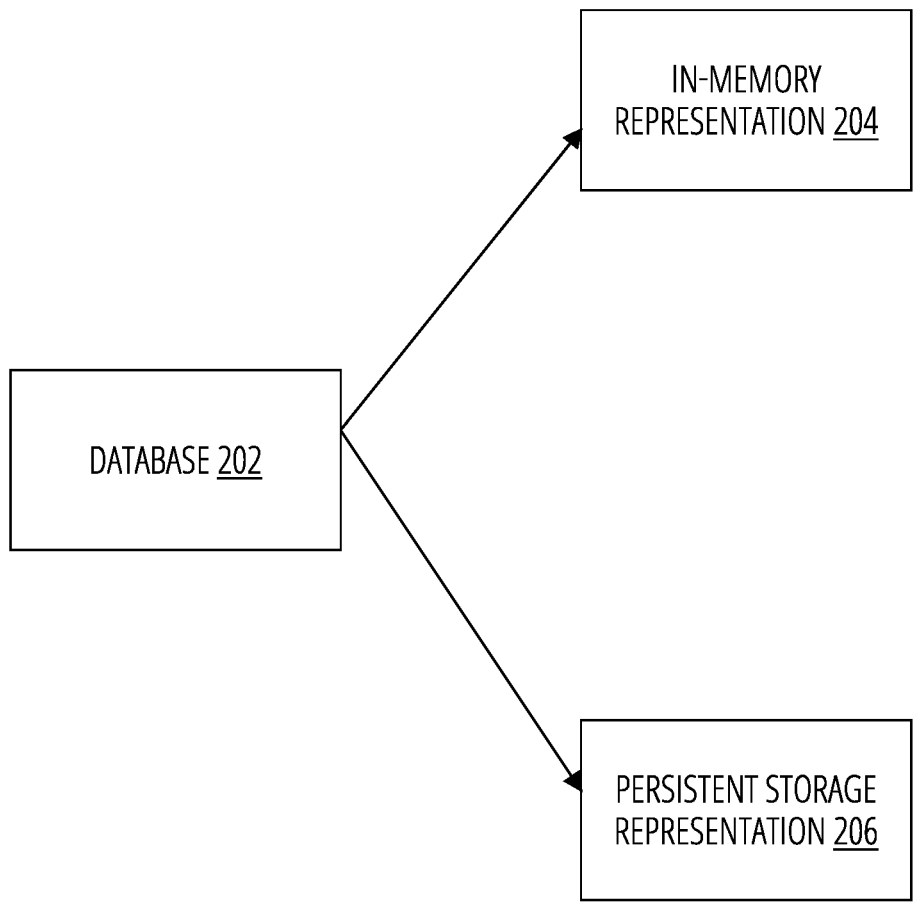
FIG. 2 illustrates a database in accordance with one embodiment.

FIG. 2 illustrates a database 202 in accordance with one embodiment.

Database 202 includes an in-memory representation 204. "Memory" can be generalized to any persistence-optional, random access storage. In some embodiments of in-memory representation 204, memory can be a dynamic random access memory (DRAM).

Database 202 also includes a persistent storage representation 206. Persistent storage can be a rotating disk, a solid state drive (SSD), non-volatile memory express (NVMe) storage, and the like.

The in-memory representation 204 of the database 202 is volatile/transient. It can always be reconstructed from the persistent storage representation 206 of the database 202.

Figure 3:
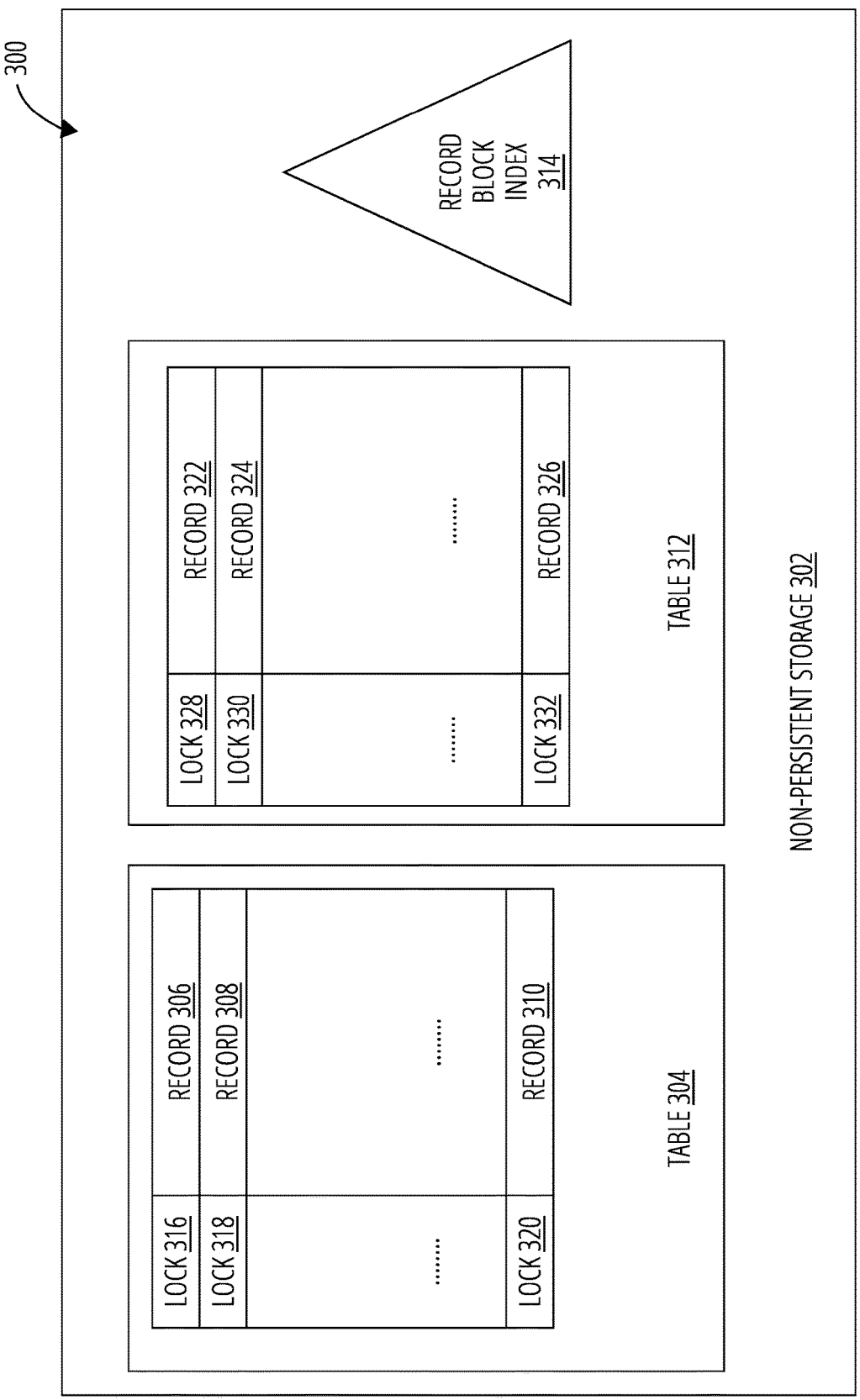
FIG. 3 illustrates an in-memory representation of a database in accordance with one embodiment.

FIG. 3 illustrates an in-memory representation 300 in accordance with one embodiment.

The in-memory representation 300 of the database may include a non-persistent storage 302 that includes one or more tables. While two tables (table 304, table 312) are shown in FIG. 3, it is understood that the non-persistent storage 302 can include more than two tables. Each table can contain zero, one, or more records. For example table 304 contains record 306, record 308 and record 310; while table 312 contains record 322, record 324 and record 326. Furthermore, non-persistent storage 302 includes a record block index 314. In addition, non-persistent storage 302 can include one or more locks which enforce exclusive access to each record. For example, record 306 is associated with lock 316; record 308 with lock 318; and record 310 with lock 320. Similarly, record 322 is associated with lock 328; record 324 with lock 330 and record 326 with lock 332. A record does not need to be associated exclusively with a lock. The lock can also be associated with other records and entities. In one embodiment, there can be a many-to-1 association between records and locks, e.g. a single lock may be used to bar access to all records of a table. For example, locks 316, 318, 320 etc. don't need to be distinct locks. This is also discussed in FIG. 14.

Figure 4:
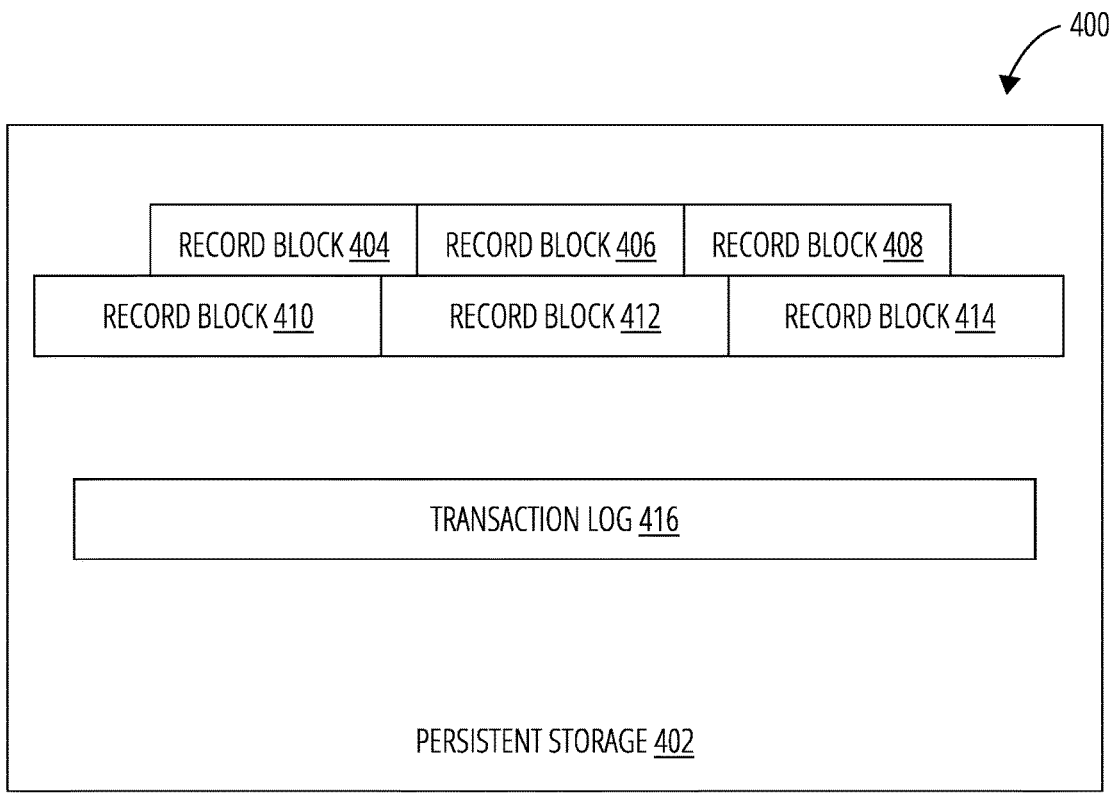
FIG. 4 illustrates a persistent storage representation of a database in accordance with one embodiment.

FIG. 4 illustrates a persistent storage representation 400 of a database in accordance with one embodiment.

The persistent storage representation 400 includes persistent storage 402. The persistent storage 402 includes a set of zero or more record blocks (for example, record block 404-record block 414); and a transaction log 416.

Figure 5:
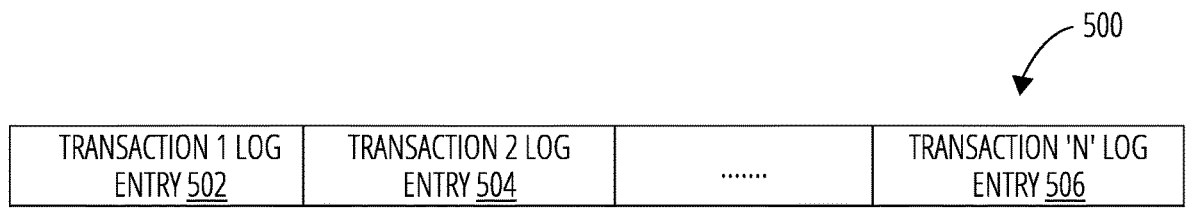
FIG. 5 illustrates a transaction log in accordance with one embodiment.

FIG. 5 illustrates a transaction log 500 in accordance with one embodiment.

The transaction log 500 includes a sequence of transaction log entries (for example, transaction 1 log entry 502, transaction 2 log entry 504 and transaction 'N' log entry 506). Each transaction log entry describes an ACID (that is, atomic, consistent, isolated and durable) update to the database. The state of the database at a given transaction—for example, transaction 'M'—can be reconstructed by sequentially applying transactions 1 through 'M'.

Figure 6:
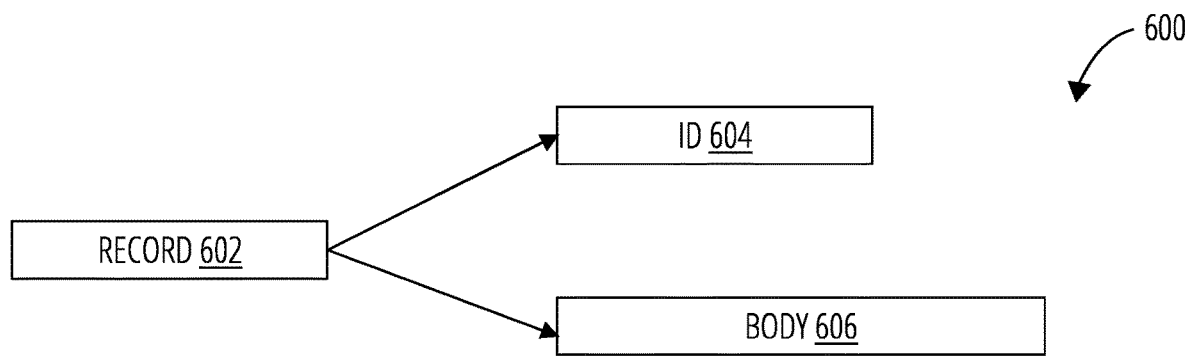
FIG. 6 illustrates an in-memory representation of a record in accordance with one embodiment.

FIG. 6 illustrates an in-memory representation 600 of a record in accordance with one embodiment. In FIG. 6, the record 602 is unversioned.

The in-memory representation of a record 602 is associated with an Id 604 and a Body 606. The Body 606 contains the data associated with the record. For example, if a table is a phone book and a record is a phone book entry such as: "Smith", "Joe", "555-1234", then the record's body contains: "Smith", "Joe", "555-1234". The record's ID is a value that uniquely identifies the record within the table. The ID can be an ordinal number. The ID is unique within the scope of a single table. Records from different tables may have the same id.

Figure 7:
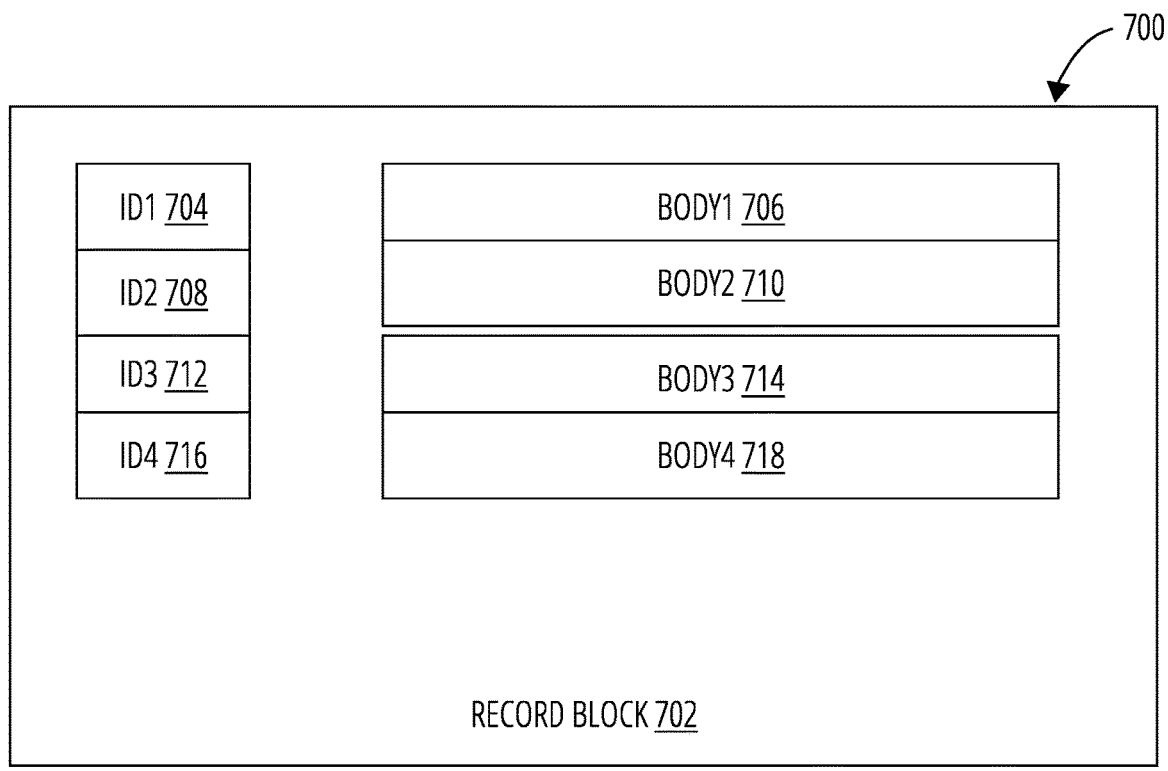
FIG. 7 illustrates the persistent storage representation of a record block in accordance with one embodiment.

FIG. 7 illustrates the persistent storage representation 700 of a record block in accordance with one embodiment.

In a persistent storage representation of the database, records are stored in one or more record blocks. In FIG. 7, a record block 702 contains a set of record ids (for example, ID1 704, ID2 708, ID3 712 and ID4 716). The record block also contains the set of record bodies (for example, body1 706, body2 710, body3 714 and body4 718) that are associated with the corresponding record ids.

Figure 8:
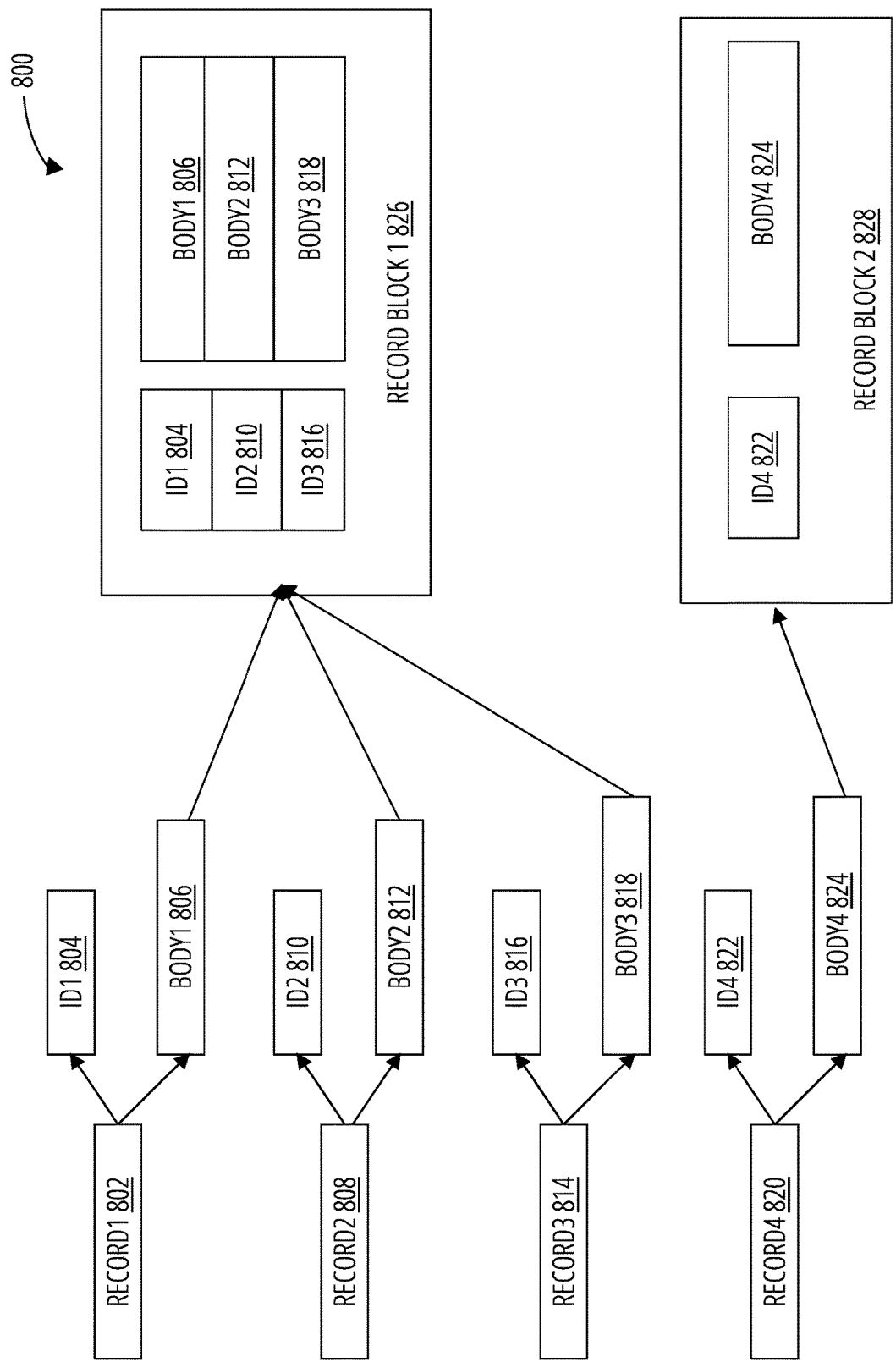
FIG. 8 illustrates a relationship between unversioned records and record blocks in accordance with one embodiment.

FIG. 8 illustrates a relationship 800 between unversioned records and record blocks in accordance with one embodiment. Record blocks are scoped to a table—that is, a record block can contain records from only one table. Records from different tables must be contained in different record blocks. In FIG. 8, Record1 802, Record2 808, Record3 814 and Record4 820 all belong to the same table.

The records of a table are arbitrarily divided among record blocks. The record blocks of a table can each contain a different number of records. For example, in FIG. 8, Record1 802, Record2 808 and Record3 814 are contained in Record block 1 826, while Record4 820 is contained in Record block 2 828.

Figure 9:
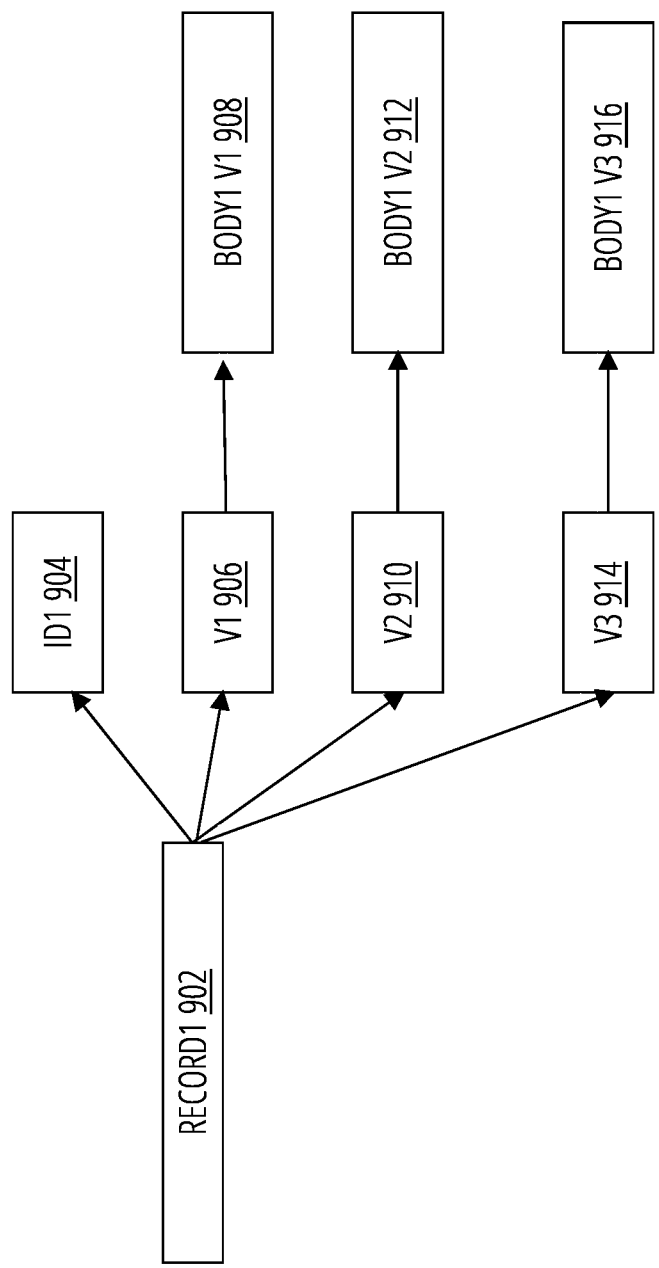
FIG. 9 illustrates an in-memory representation of a versioned record, in accordance with one embodiment.

FIG. 9 illustrates an in-memory representation of a versioned record 900, in accordance with one embodiment.

A versioned database stores multiple versions of each record. A database that can store only one version of each record is called an unversioned database.

In a versioned database, each record is a versioned record. Each record has an ID (as in FIG. 6), one or more associated versions and a body associated with each version. For example, in FIG. 9, Record1 902 has Id1 904; and associated versions v1 906, v2 910 and v3 914. Body1 v1 908 is associated with version v1 906; Body1 v2 912 is associated with version v2 910; and Body1 v3 916 is associated with version v3 914.

Figure 10:
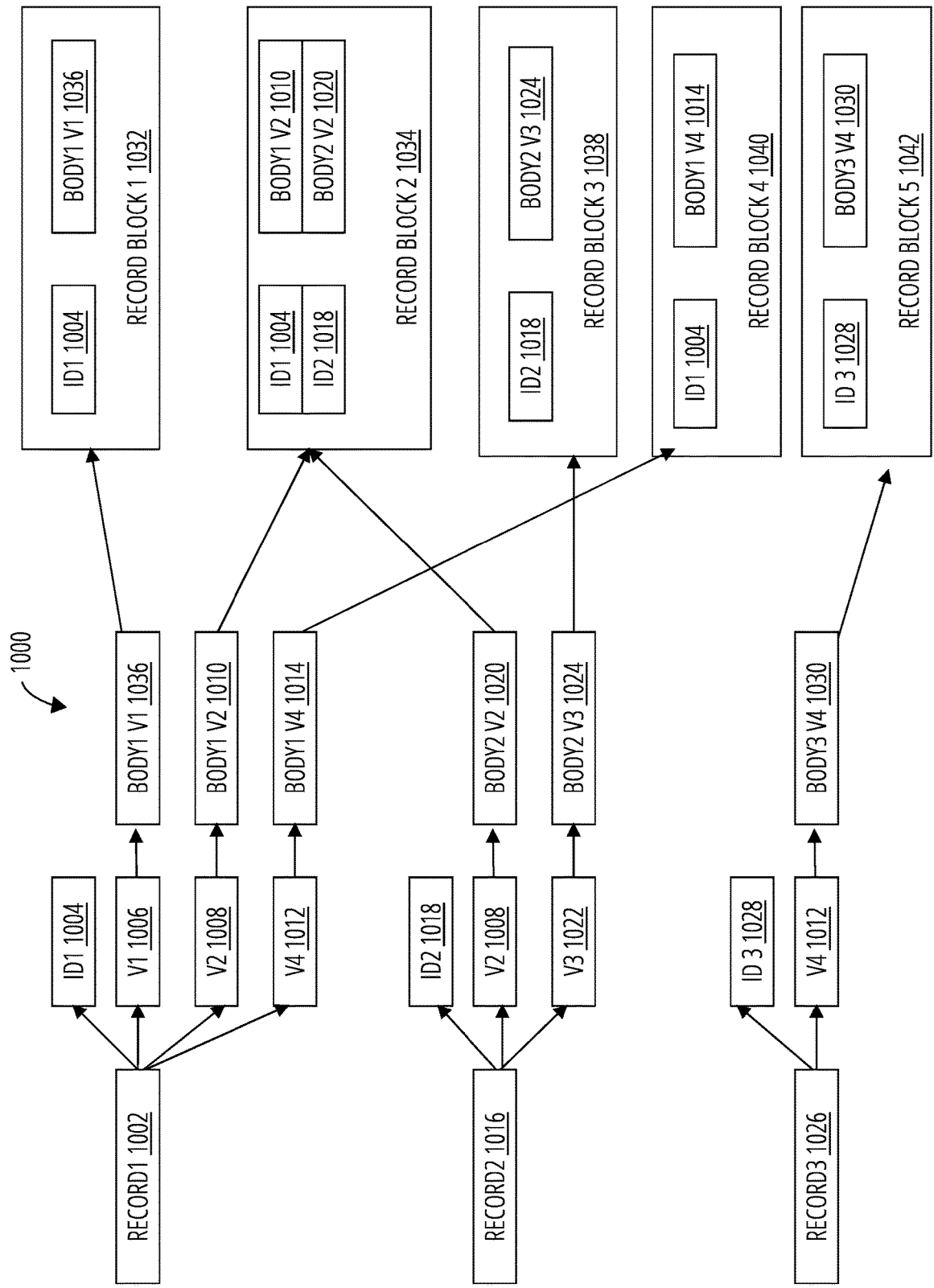
FIG. 10 illustrates a relationship of versioned records to record blocks in accordance with one embodiment.

FIG. 10 illustrates a relationship 1000 of versioned records to record blocks in accordance with one embodiment.

The record blocks for a versioned database are scoped to a table and a version. That is, a record block can contain records from only one version of one table. Records from different tables or different versions are contained in different record blocks.

As with unversioned record blocks, the records of a table and version are arbitrarily divided among record blocks. A version can be associated with zero, one or more record blocks.

Figure 11:
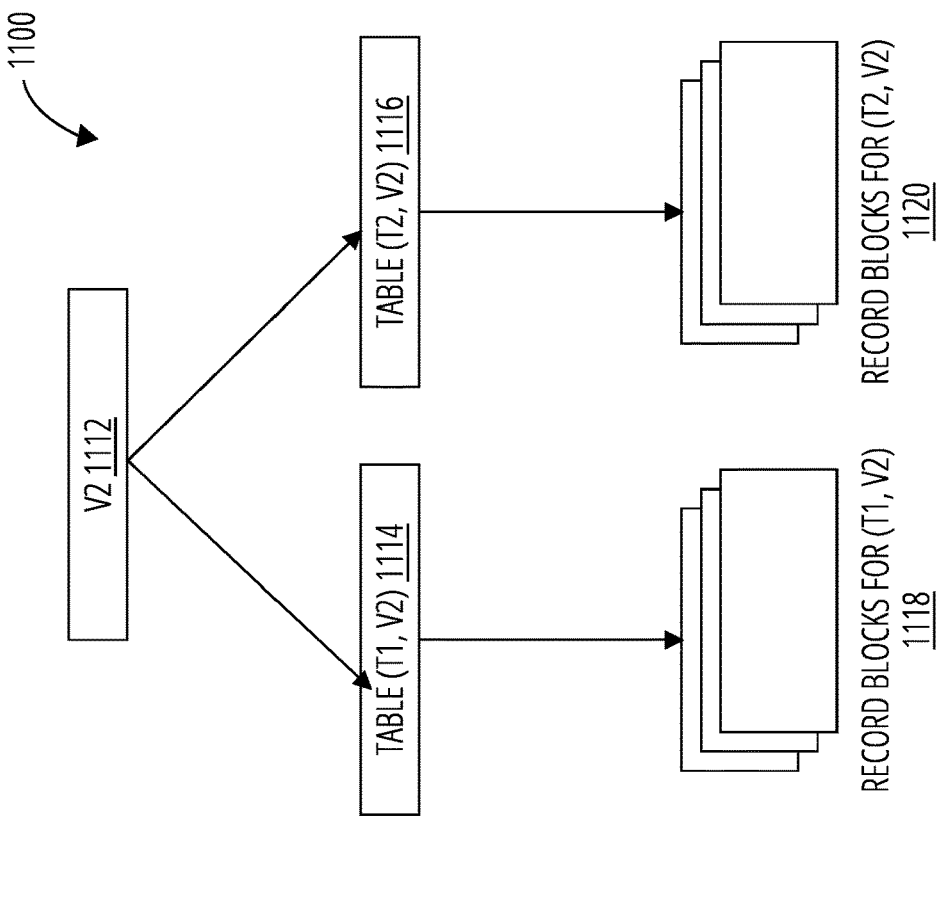
FIG. 11 illustrates a versioned record block entity relationship in accordance with one embodiment.
Figure 11:
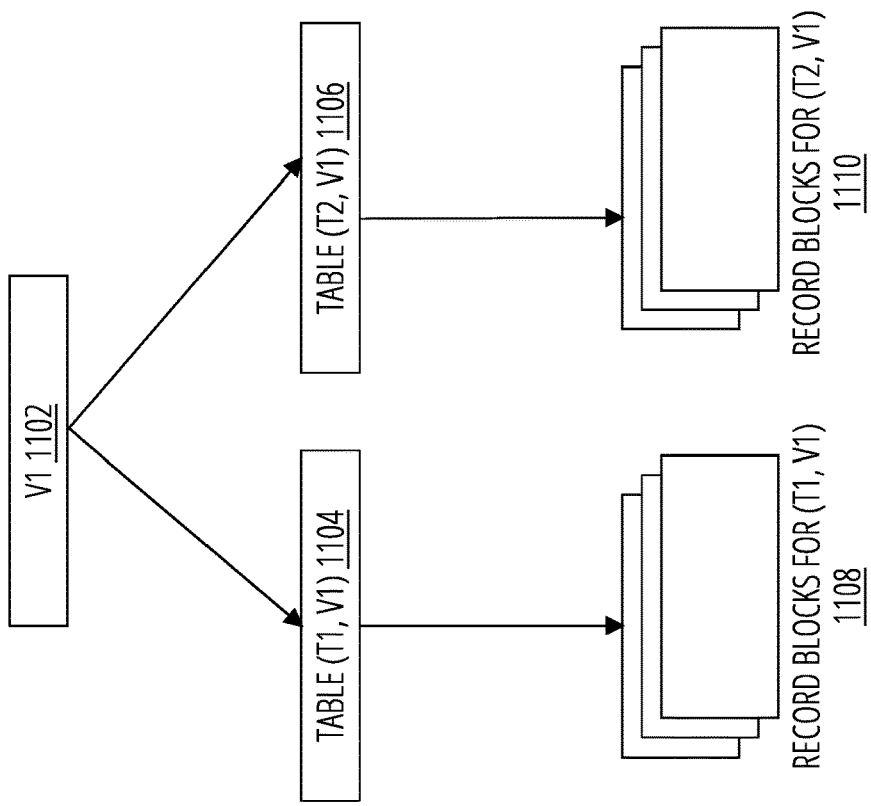

FIG. 11 illustrates versioned record block entity relationships 1100 in accordance with one embodiment.

From a database-wide perspective, each version of the database is associated with a set of record blocks for each table. For example, in FIG. 11, there are two tables (T1, T2) and two versions (V1 1102 and V2 1112). There are two versions of Table T1, denoted Table (T1, V1) 1104 and Table (T1, V2) 1114. There are two versions of Table T2, denoted Table (T2, V1) 1106 and Table (T2, V2) 1116. There is a set of record blocks for (T1, V1) 1108 and a set of record blocks for (T2, V1) 1110. Similarly, there is a set of record blocks for (T1, V2) 1118 and a set of record blocks for (T2, V2) 1120.

Figure 12:
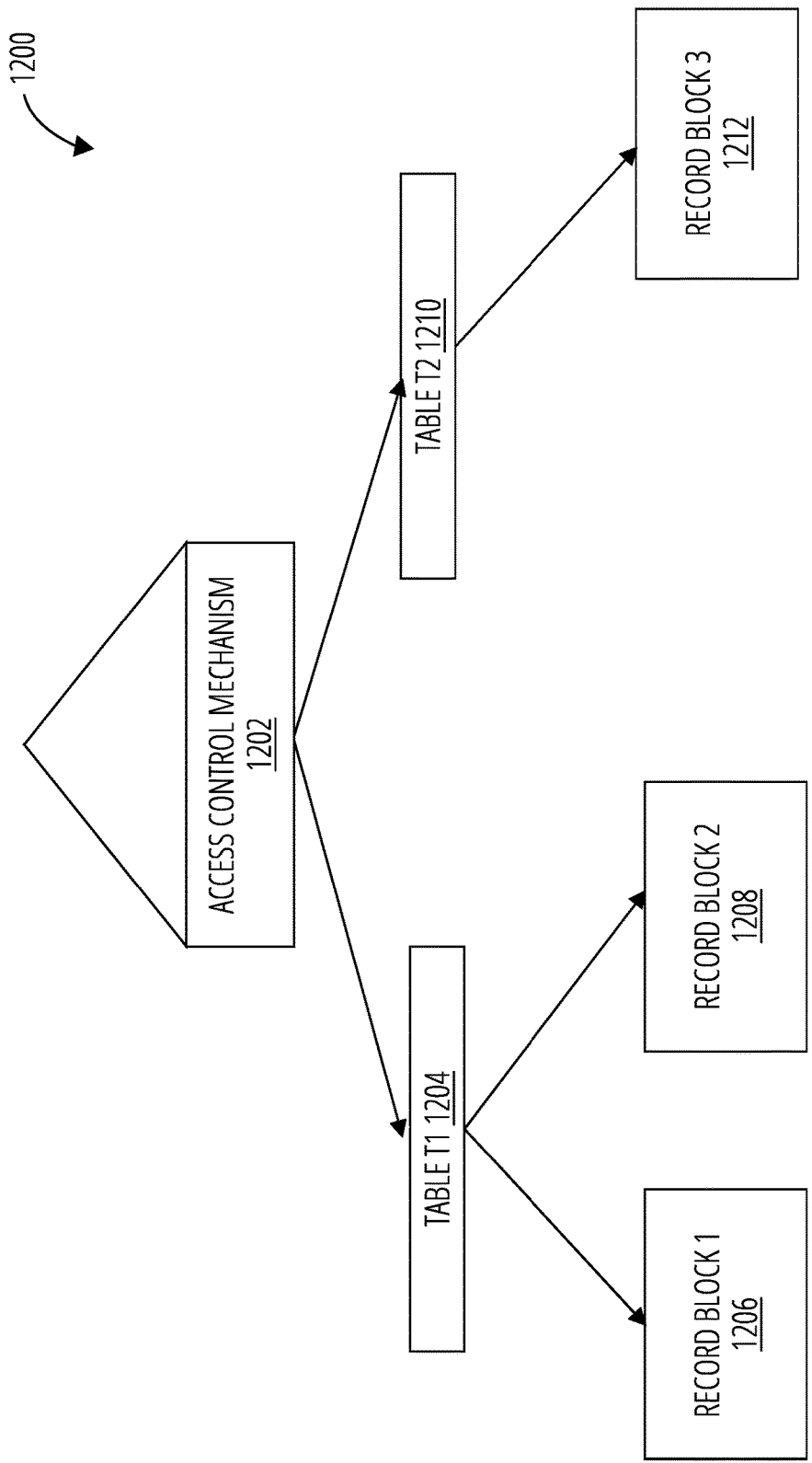
FIG. 12 illustrates an in-memory representation of an unversioned record block index in accordance with one embodiment.

FIG. 12 illustrates an in-memory representation of an unversioned record block index 1200 in accordance with one embodiment.

A Record Block Index is an in-memory representation of the relationships between versions, tables, records, and record blocks (as described in FIG. 11), which enables identification of record blocks that contain the data for a given table and version.

As shown in FIG. 12, an unversioned database has an unversioned record block index 1200, which holds information for exactly one version of the database. The record block index has an access control mechanism 1202, which enables update of its contents.

Figure 13:
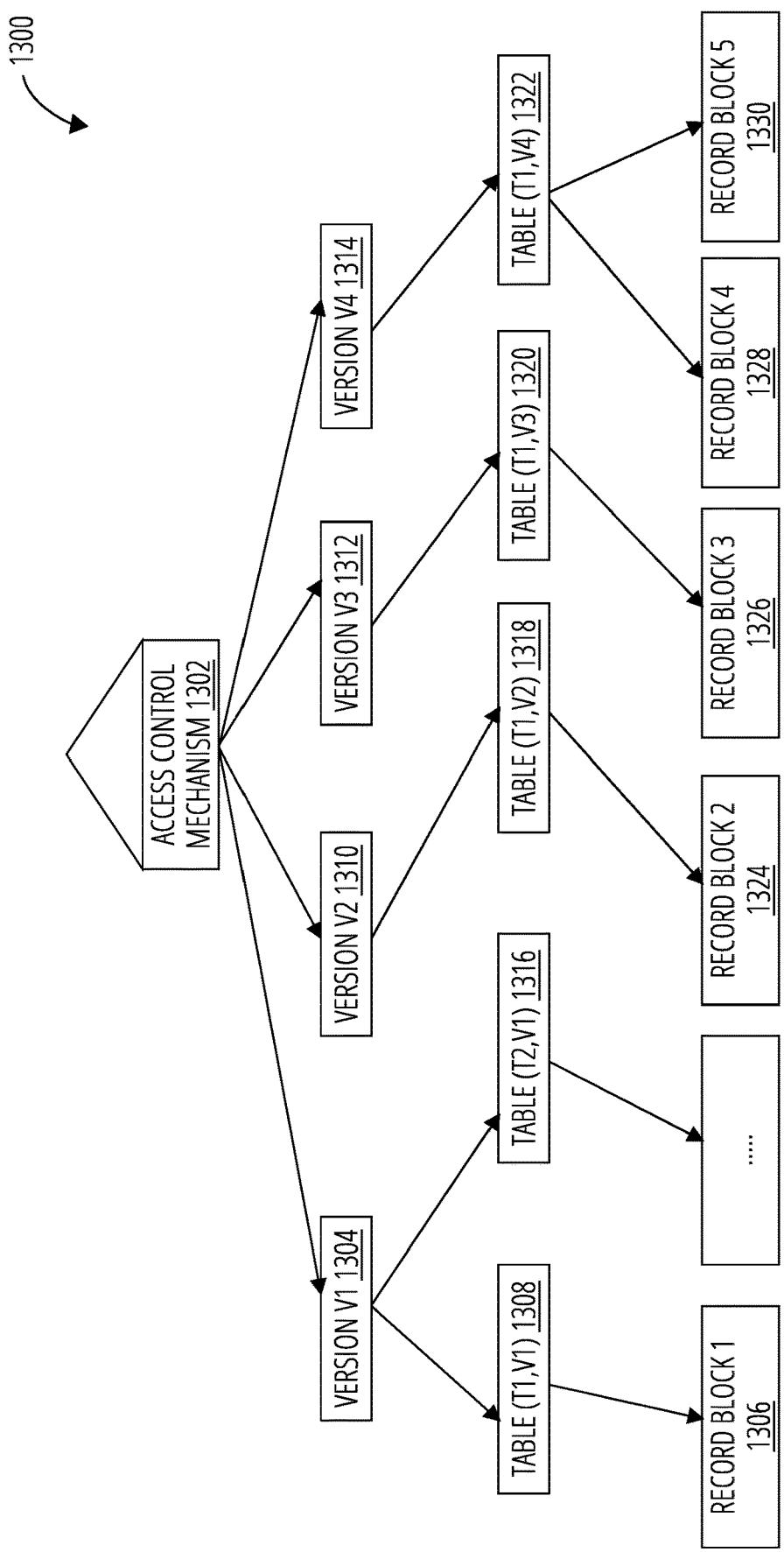
FIG. 13 illustrates an in-memory representation of a versioned record block index in accordance with one embodiment.

FIG. 13 illustrates an in-memory representation of a versioned record block index 1300 in accordance with one embodiment.

A versioned database has a versioned record block index 1300, as shown, for example, in FIG. 13. It holds information for multiple versions of the database.

The record block index has an access control mechanism 1302 which enables for an atomic update of its contents. It can be implemented by any of known techniques in the art, including: a b+ tree locking technique; or any of the exclusive lock mechanisms identified in the process overview 1400 below.

Figure 14:
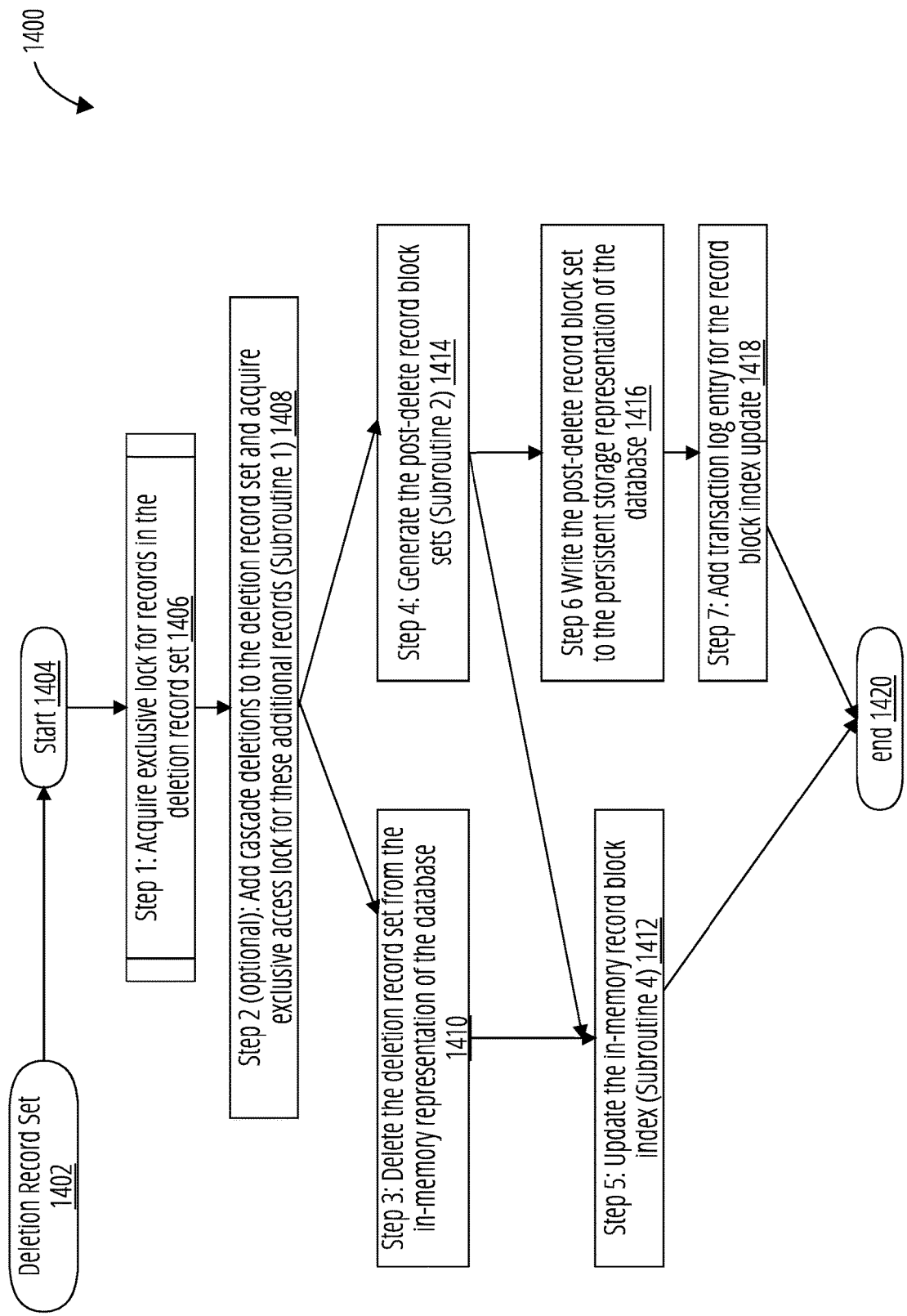
FIG. 14 illustrates a process overview in accordance with one embodiment.

FIG. 14 illustrates a process overview 1400 in accordance with one embodiment.

The input to this process is a deletion record set 1402, which is a set of records to be deleted, identified by the tables and IDs of the records. It can be input by a database user. The deletion set can be a list of records per table.

These records may be identified by querying the database for records that match certain conditions. In another method, a database user can execute an internal database procedure to identify records that match certain conditions.

In the process overview 1400, at step 1: acquire an exclusive lock for the records in the deletion record set. There are known implementations in the art of exclusive locks, including, for example:

(1) Mutual exclusion lock that is acquired by all readers and writers;
(2) Readers-writer lock, where the exclusive lock is the writer lock;
(3) Acquire and release may be no-ops if exclusive access to the records to be deleted is already known when the bulk deletion process is being run. For example, the database administrator can terminate all clients except the client that is running the bulk deletion process; and
(4) Other types of database access locks can be used to implement exclusive access.

The exclusive lock's granularity may be: database-wide, table-wide, per-group of records, or per-record.

Step 2, as shown in FIG. 14, is optional. To maintain referential integrity of the database, it may be desirable to additionally delete records that reference records in the deletion record set. This feature is known as cascade deletion, and is further described in Subroutine 1 (see FIG. 15)

which describes how to compute the records that should be cascade deleted, and add them to the deletion record set.

Step 3 and Step 4 can be executed in parallel.

At Step 3, delete the deletion record set from the in-memory representation of the database.

At Step 4, for each (table, version), define the term "per-(table, version) pre-delete record block set" to mean the set of record blocks that contain the data for that (table, version) at the point in time before the bulk-delete process begins. These are identified by the record block index. Step 4 processes the pre-delete record block sets using Subroutine 2 (which is described in FIG. 16). The outputs of Subroutine 2 are the per-(table, version) post-delete record block sets.

Figure 19:
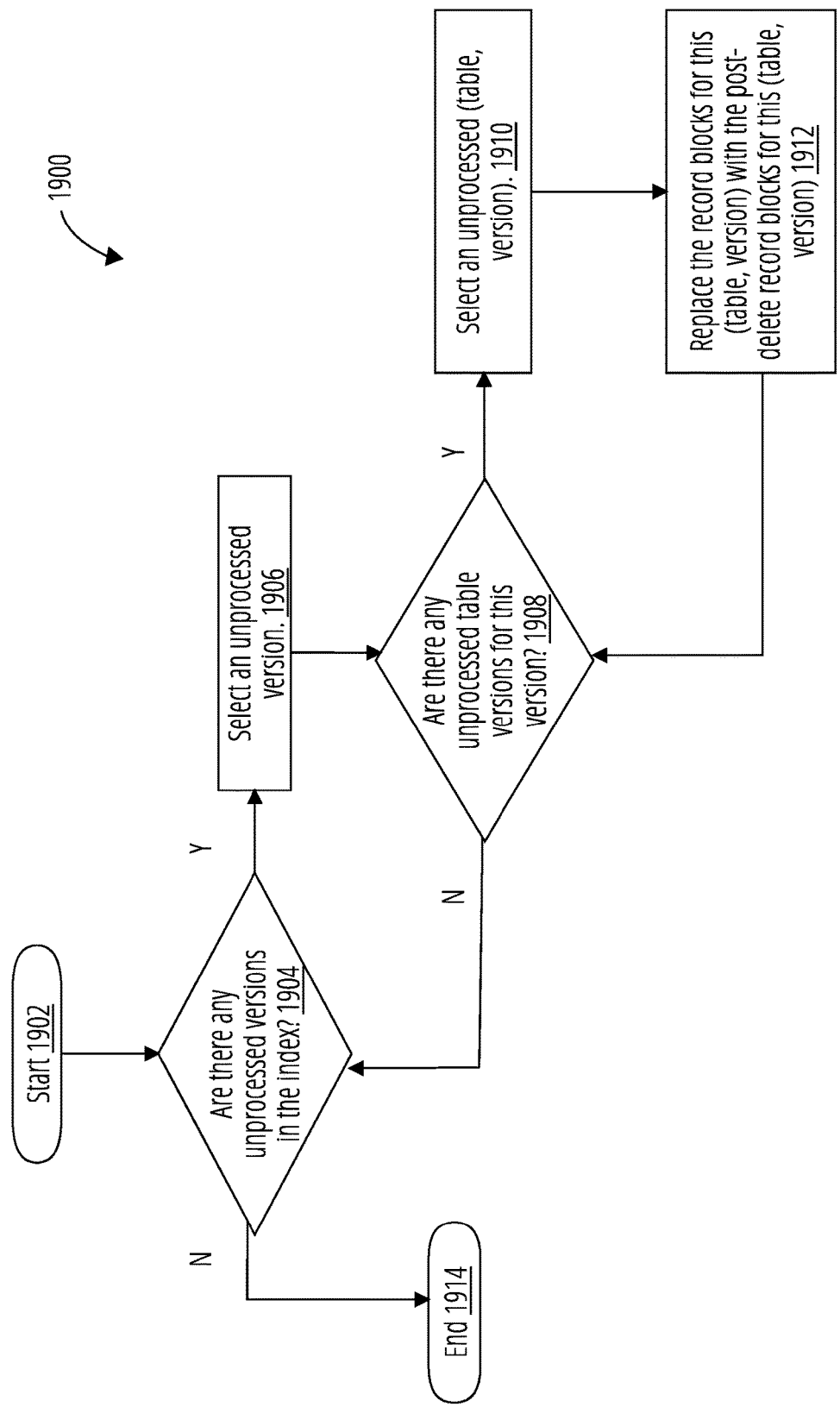
FIG. 19 illustrates a fourth subroutine in accordance with one embodiment.

Step 5 is executed after completion of Steps 3 and 4. Step 5 replaces the pre-delete record block set for each (table, version) with the corresponding post-delete record block set in the record block index. This is described further in Subroutine 4 (FIG. 19).

At Step 6, write the new post-delete record blocks to the persistent storage. The post-delete record block sets may contain both pre-existing and new record blocks. Some record blocks from the pre-delete sets don't require modification, so they can be transferred to the post-delete record block sets. Since these record blocks already reside in the persistent storage representation, they do not need to be rewritten. New record blocks are generated by Subroutine 2, as described in FIG. 16.

At Step 7, transaction log the record block index update. This appends an entry to the transaction log that describes the record blocks to be removed and added to the record block index. See Example 1d) below for an example.

Step 5 can be executed in parallel with Steps 6 and 7. The process ends when all steps have been completed.

Subroutine 1

Figure 15:
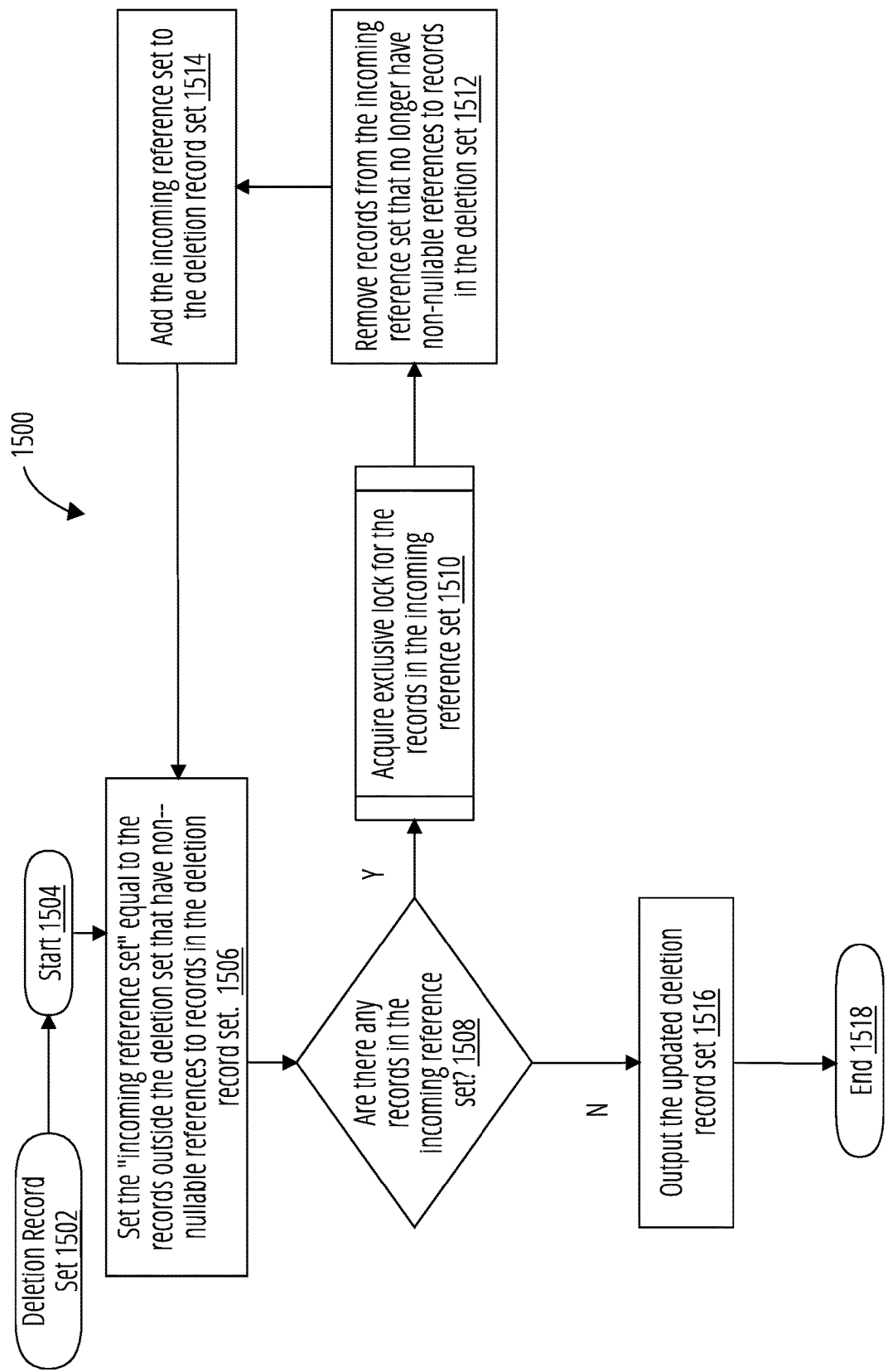
FIG. 15 illustrates a first subroutine in accordance with one embodiment.

FIG. 15 illustrates Subroutine 1 1500 in accordance with one embodiment. In summary, Subroutine 1 adds cascade deletions to the deletion record set, and acquires exclusive access lock for the additional records.

After receiving a deletion record set (step 1502), at block 1506, Subroutine 1 1500 sets the "incoming reference set" equal to the records outside the deletion set that have non-nullable references to records in the deletion record set.

If there are no records in the incoming reference set ('no' at decision block 1508), then the updated deletion record set is output (block 1516), and the subroutine ends at 1518.

If, on the other hand, there are records in the incoming reference set ('yes' at decision block 1508), then an exclusive lock for the records in the incoming reference set is acquired (1510). Subsequently, records from the incoming reference set that no longer have non-nullable references to records in the deletion set, are removed from the incoming reference set (block 1512). At block 1514, add the incoming reference set to the deletion record set. The process then returns to block 1506, and resumes.

Subroutine 2

Figure 16:
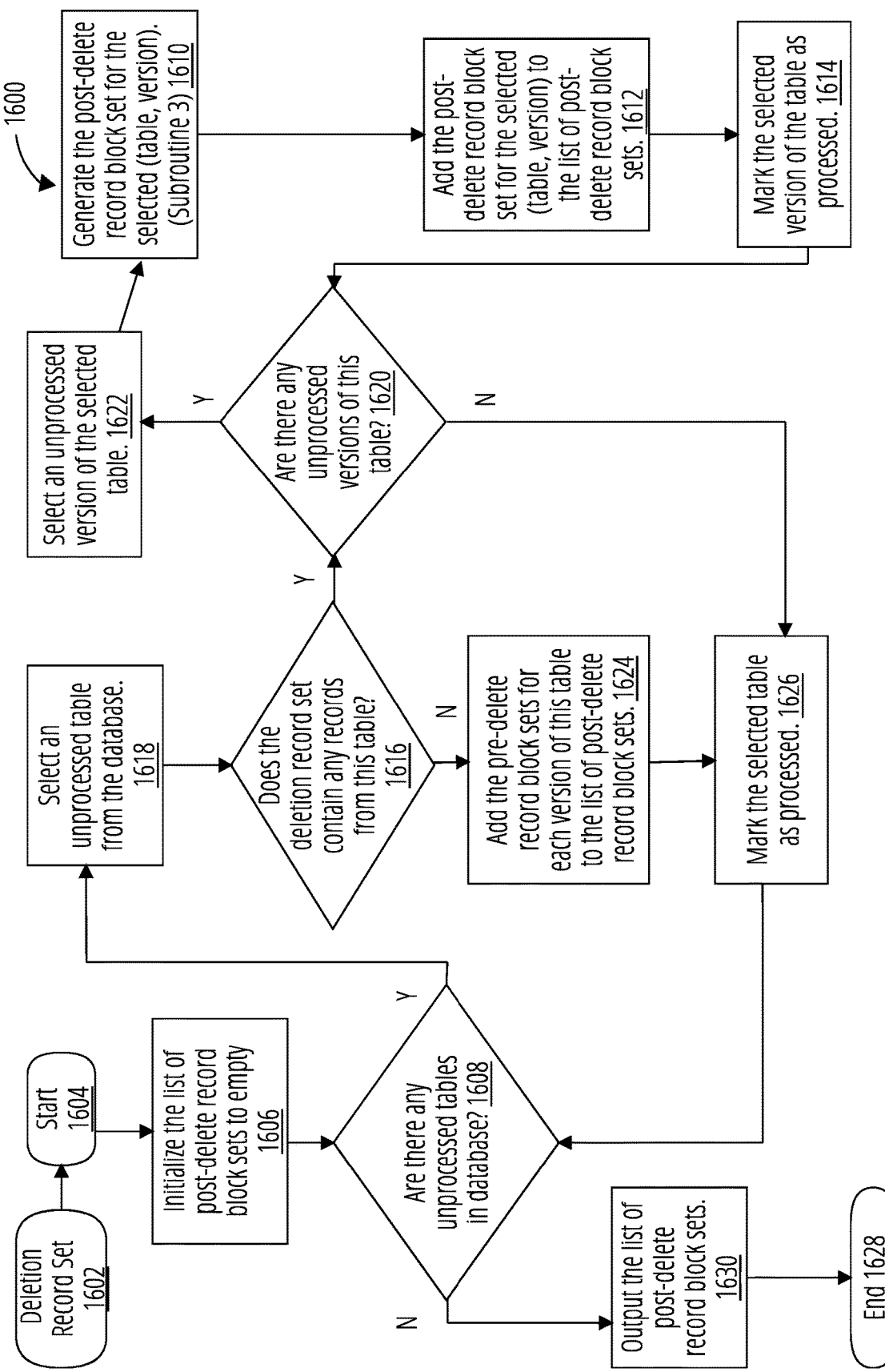
FIG. 16 illustrates a second subroutine in accordance with one embodiment.

FIG. 16 illustrates Subroutine 2 1600 in accordance with one embodiment. Subroutine 2 generates the post-delete record block sets.

In summary, Subroutine 2 transforms the pre-delete record block sets by dropping out the records specified by the input deletion record set. The transformed record blocks are the post-delete record block sets. Subroutine 2 iterates Subroutine 3 (at block 1610) for each table and table version in the database. The iteration order is not significant.

After receiving a deletion record set (step 1602), at block 1606, Subroutine 2 1600 initializes the list of post-delete record block sets to empty.

If there are no unprocessed tables in the database ('no' at decision block 1608), then the list of post-delete record block sets is output (block 1630), and the subroutine ends at 1628.

If, on the other hand, there are unprocessed tables in the database ('yes' at decision block 1608), then an unprocessed table is selected at block 1618. This is followed by decision block 1616, at which point the deletion record set is checked to see if it contains any records from this table.

If the deletion record set does not contain any records from this table ('no' at decision block 1616), then the pre-delete record block sets for each version of this table is added to the list of post-delete record block sets (block 1624). The selected table is then marked as processed (block 1626), and the subroutine returns to decision block 1608.

If the deletion record set does contain any records from this table ('yes' at decision block 1616), then decision block 1620 is encountered, to see if there are any unprocessed versions of this table. If there are no unprocessed versions of this table ('no' at decision block 1620), then the subroutine returns to block 1626 to mark the selected table as processed.

If there are unprocessed versions of this table ('yes' at decision block 1620), then an unprocessed version of the selected table is selected (block 1622). This is followed by using Subroutine 3 to generate the post-delete record block set for the selected (table, version) at block 1610. Subroutine 3 is further described in FIG. 17 and FIG. 18.

Subsequently, the post-delete record block set for the selected (table, version) is added to the list of post-delete record block sets at block 1612. The selected version of the table is marked as processed (block 1614), and decision block 1620 is once again processed.

Subroutine 3

As described in FIG. 16, Subroutine 2 iterates Subroutine 3 for each table and table version in the database. The iteration order is not significant.

In summary, Subroutine 3 generates the post-delete record block set for a specific (table, version). Other record block transformations can be combined with Subroutine 3, but they are not necessary for the bulk deletion process work. Two implementations of Subroutine 3 are provided to illustrate this.

Subroutine 3, Implementation 1

Figure 17:
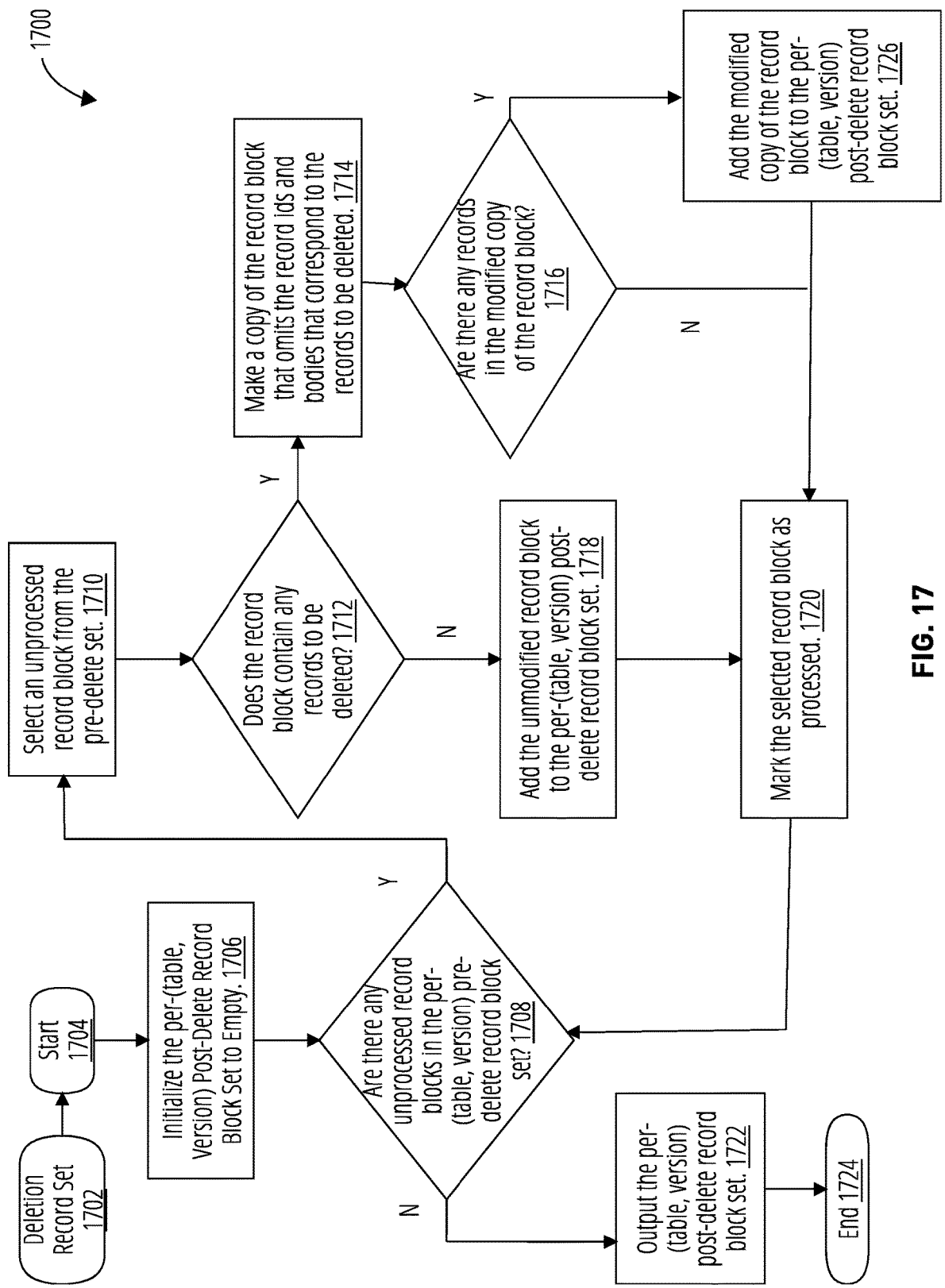
FIG. 17 illustrates a first implementation of a third subroutine in accordance with one embodiment.

FIG. 17 illustrates a first implementation of Subroutine 3 1700 in accordance with one embodiment. In FIG. 17, Subroutine 3 generates the post-delete record block set for the selected (table, version).

After receiving a deletion record set (step 1702), at block 1706, Subroutine 3 1700 initializes the per-(table, version) post-delete record block set to empty.

If there are no unprocessed record blocks in the per-(table, version) pre-delete record block set ('no' at decision block 1708), then the per-(table, version) post-delete record block set is output (block 1722), and the subroutine ends at 1724.

If, on the other hand, there are unprocessed record blocks in the per-(table, version) pre-delete record block set ('yes' at decision block 1708), then an unprocessed record block from the pre-delete set is selected at 1710. This is followed by decision block 1712, at which point the record block is checked to see if it contains any records to be deleted.

If the record block does not contain any records to be deleted ('no' at decision block 1712), then the unmodified record block is added to the per-(table, version) post-delete record block set (block 1718). The selected record block is then marked as processed (block 1720), and the subroutine returns to decision block 1708.

If the record block does contain records to be deleted ('yes' at decision block 1712), then the subroutine makes a copy of the record block that omits the record IDs and bodies that correspond to the records to be deleted (block 1714). This is followed by decision block 1716, at which point there is a check on whether there are any records in the modified copy of the record block.

If there are no records in the modified copy of the record block ('no' at decision block 1716), then the selected record block is marked as processed (block 1720), and the subroutine returns to decision block 1708.

If there are records in the modified copy of the record block ('yes' at decision block 1716), then the modified copy of the record block is added to the per-(table, version) post-delete record block set (block 1726). The selected record block is then marked as processed (block 1720), and the subroutine returns to decision block 1708.

Subroutine 3, Implementation 2

Figure 18:
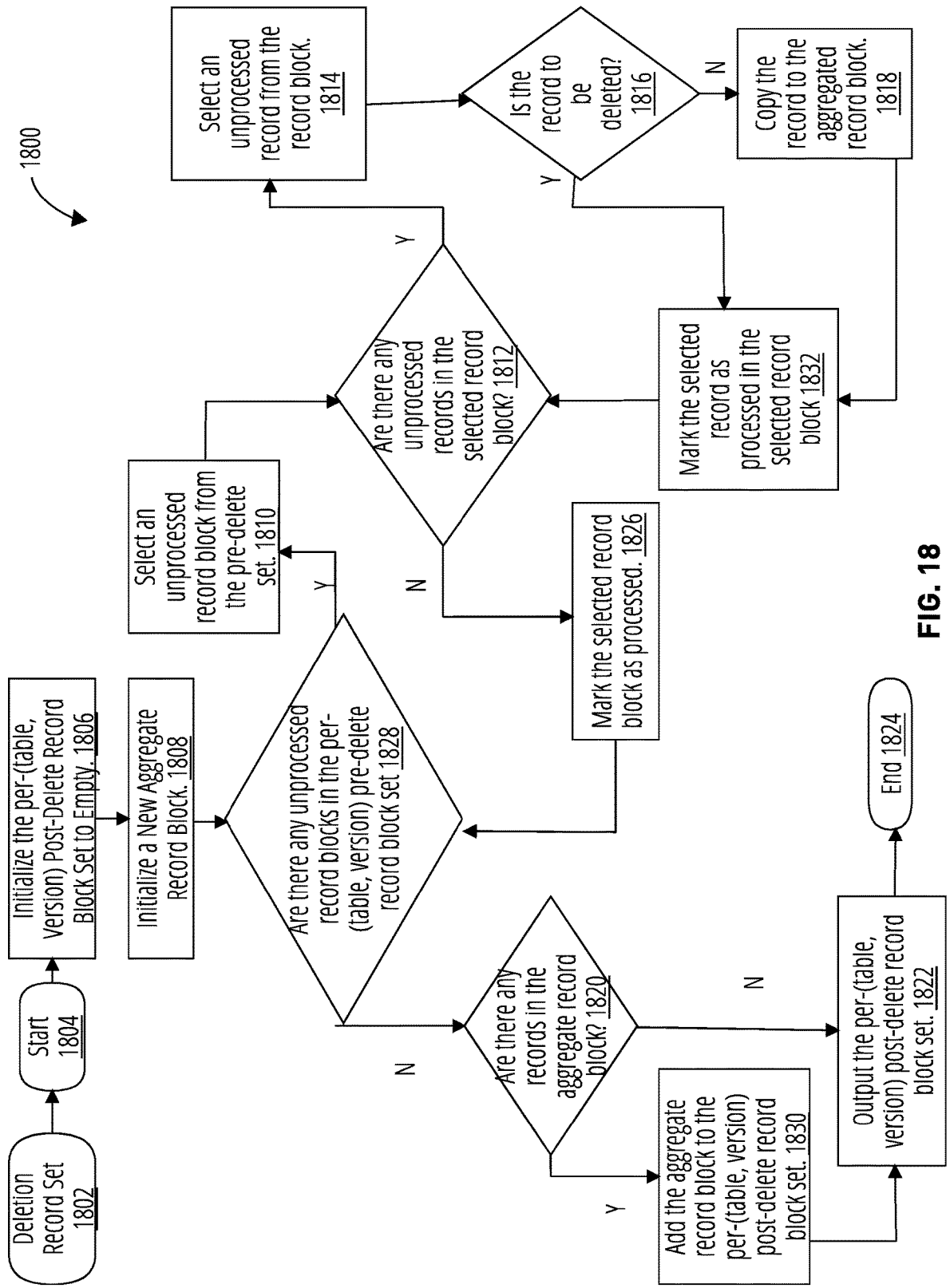
FIG. 18 illustrates a second implementation of a third subroutine in accordance with one embodiment.

FIG. 18 illustrates a second implementation of Subroutine 3 1800 in accordance with one embodiment. In FIG. 18, Subroutine 3 generates the post-delete record block set for the selected (table, version).

After receiving a deletion record set (at 1802), at block 1806, Subroutine 3 1800 initializes the per-(table, version) post-delete record block set to empty. It then initializes a new aggregate record block at 1808.

If there are no unprocessed record blocks in the per-(table, version) pre-delete record block set ('no' at decision block 1828), then there is a check to see if there are any records in the aggregate record block at decision block 1820. If there are records in the aggregate record block ('yes' at decision block 1820), then the aggregate record block is added to the per-(table, version) post-delete record block set (at 1830), followed by output of the per-(table, version) post-delete record block set (at 1822), after which the subroutine ends at 1824. If there are no records in the aggregate record block ('no' at decision block 1820), then there is output of the per-(table, version) post-delete record block set (at 1722), after which the subroutine ends at 1724.

If there are unprocessed record blocks in the per-(table, version) pre-delete record block set ('yes' at decision block 1728), then an unprocessed record block from the pre-delete set is selected at 1810. This is followed by decision block 1812, at which point there is a check to see if there are any unprocessed records in the selected record block. If there are no unprocessed records in the selected record block ('no' at decision block 1812), then the selected record block is marked as processed (at 1826), and the subroutine returns to decision block 1728.

If, on the other hand, there are unprocessed records in the selected record block ('yes' at decision block 1812), then an unprocessed record is selected from the record block (at 1814). If the record is to be deleted ('yes' at decision block 1816), then the selected record is marked as processed (at 1832), and the subroutine returns to decision block 1812. If the record is not to be deleted ('no' at decision block 1816), then the record is copied to the aggregated record block (at 1818), followed by marking the selected record as processed (at 1832), and the subroutine returns to decision block 1812.

Subroutine 4

FIG. 19 illustrates Subroutine 4 1900 in accordance with one embodiment. In FIG. 19, Subroutine 4 updates the record block index.

In summary, Subroutine 4 iterates each (table, version) in the record block index, and replaces the record block set for each (table, version) with the per-(table, version) post-delete record block set. The (table, version) iteration order is not significant. The record block index's access control mechanism is used to ensure that other users always observe a consistent view of the record block index.

According to FIG. 19, if there are no unprocessed versions in the index ('no' at decision block 1904), then the subroutine ends at 1914.

On the other hand, if there are unprocessed versions in the index ('yes' at decision block 1904), then an unprocessed version is selected at 1906. If there are any unprocessed table versions for this version ('yes' at decision block 1908), then an unprocessed (table, version) is selected at 1910, followed by replacement of the record blocks for this (table, version) with the post-delete record blocks for this (table, version) at 1912, after which the subroutine returns to decision block 1908. However, if there are no unprocessed table versions for this version ('no' at decision block 1908), then the subroutine returns to decision block 1904.

Example 1

Figure 20:
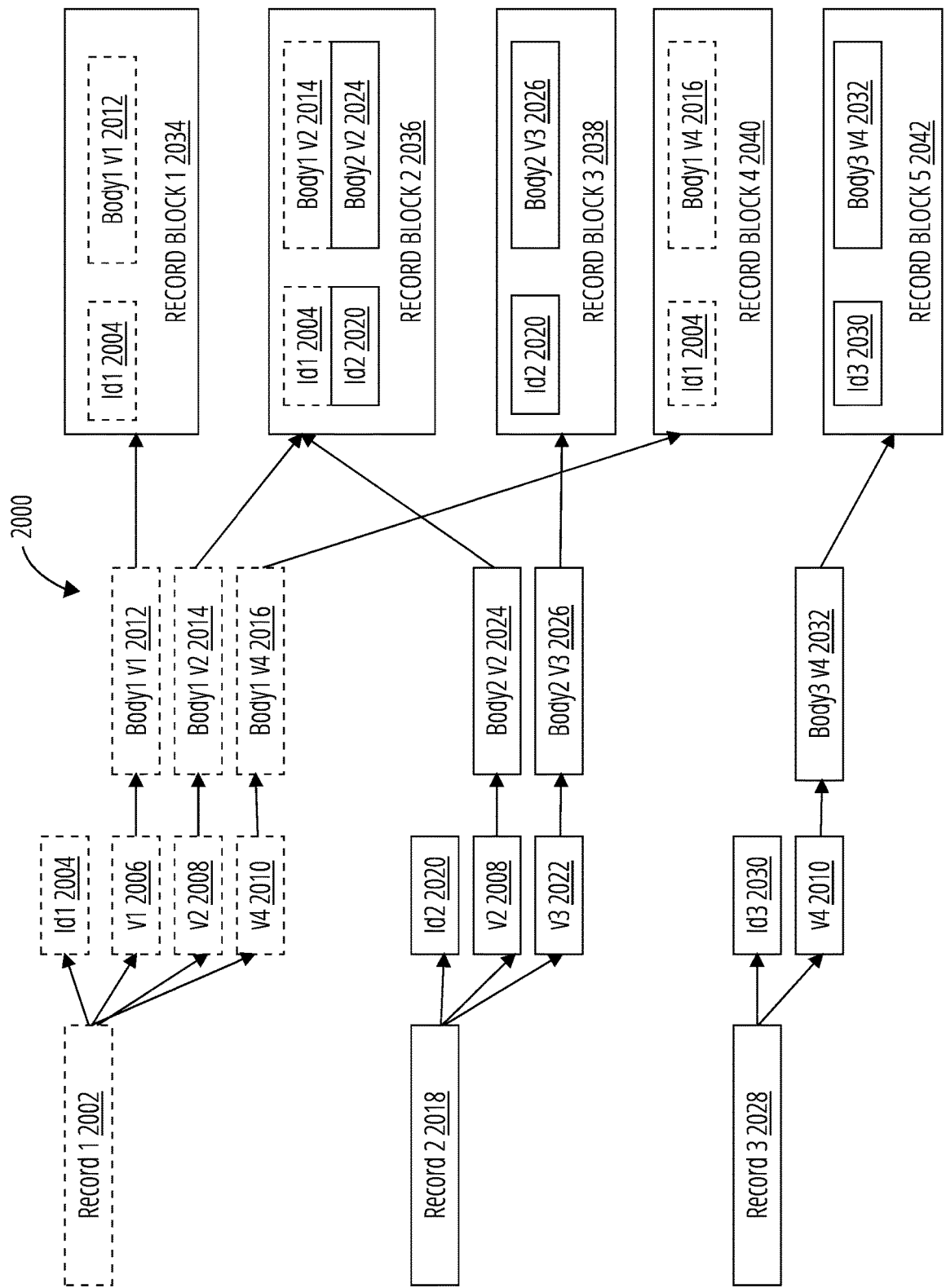
FIG. 20 illustrates a first aspect of an example in accordance with one embodiment.
Figure 21:
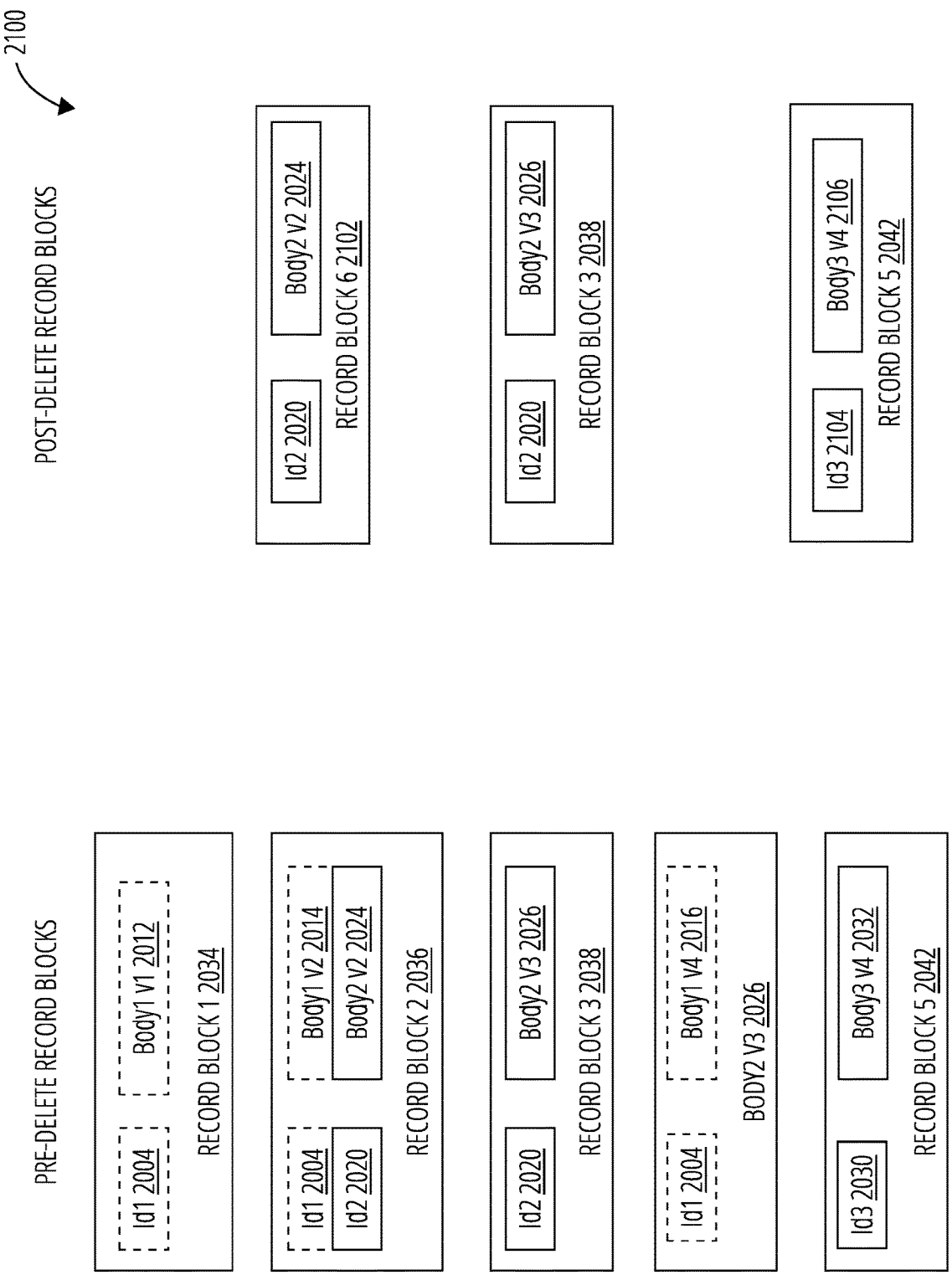
FIG. 21 illustrates a second aspect of the example shown in FIG. 20.
Figure 22:
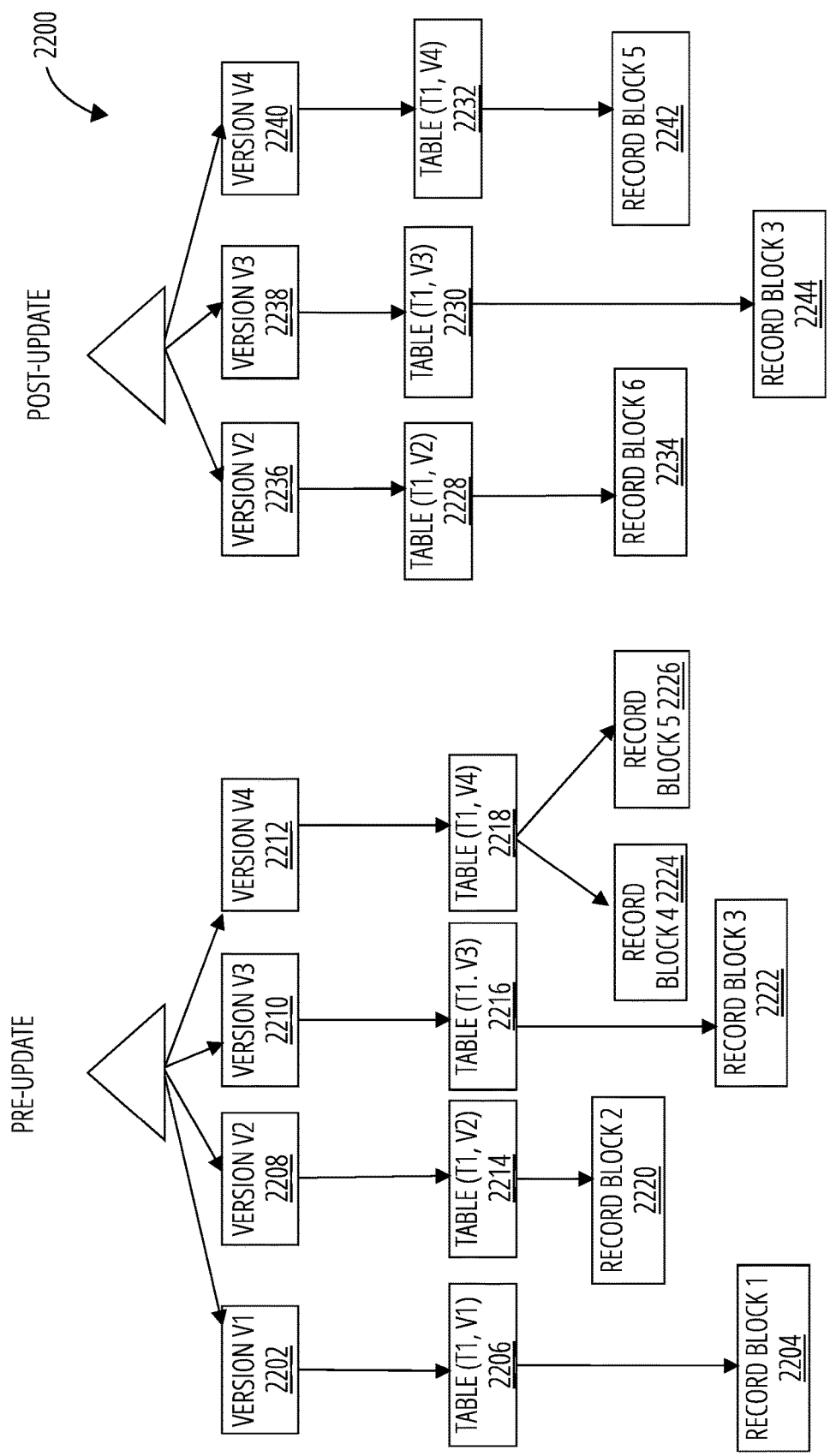
FIG. 22 illustrates a third aspect of the example shown in FIG. 20.

In Example 1, Record1 is deleted from Table T1. This is illustrated in FIG. 20-FIG. 22, as follows:

FIG. 20 (Example 1A) illustrates the entities associated with Record1 that need to be deleted;

FIG. 21 (Example 1B) illustrates the pre- and post-delete record block sets; and FIG. 22 (Example 1C) illustrates the pre- and post-update record block index.

Example 1A

FIG. 20 illustrates Example 1A 2000 in accordance with one embodiment. In particular, FIG. 20 (Example 1A) illustrates the entities associated with Record1 that need to be deleted—as shown in the dashed boxes.

Record 1 2002 has associated with it: ID1 2004, v1 2006, v2 2008 and v4 2010; while v1 2006 is associated with Body1 v1 2012, v2 2008 is associated with Body1 v2 2014, and v4 2010 is associated with Body1 v4 2016. As such, ID1 2004 and Body1 v1 2012, in Record Block 1 2034, need to be deleted; ID1 2004 and Body1 v2 2014, in Record Block 2 2036, need to be deleted; and ID1 2004 and Body1 v4 2016, in Body2 V3 2026, need to be deleted.

Note that Record 2 2018 and Record 3 2028 are not to be deleted.

Record 2 2018 has associated with it: ID2 2020, v2 2008 and v3 2022, while v2 2008 is associated with Body2 v2 2024 and v3 2022 is associated with Body2 V3 2026. Record Block 2 2036 includes ID2 2020 and its associated Body2 v2 2024, while Body2 V3 2026 includes ID2 2020 and Body2 V3 2026.

Record 3 2028 has associated with it: ID3 2030 and v4 2010, while v4 2010 is associated with Body3 v4 2032. Record Block 5 2042 includes ID3 2030 and its associated Body3 v4 2032.

Example 1B

FIG. 21 illustrates Example 1B 2100. In particular, FIG. 21 (Example 1B) illustrates deletion of Record1: deleted Record Blocks via Subroutine 4 (see FIG. 19 for Subroutine 4).

On the left of FIG. 21, are the pre-delete record blocks, which are the record blocks shown in FIG. 20 (i.e. Record Block 1 2034, 2036, Body2 V3 2026, Body2 V3 2026, and Record Block 5 2042). The entities to be deleted are outlined in dashed boxes: ID1 2004 with its associated Body1 v1

2012; ID1 2004 with its associated Body1 v2 2014; and ID1 2004 with its associated Body1 v4 2016.

On the right of FIG. 21, are the post-delete record blocks: Record Block 6 2102, Body2 V3 2026, and Record Block 5 2042. Note that Record Block 1 2034 and Body2 V3 2026 have been deleted entirely, since each contains only an ID and associated Body that is to be deleted: Record Block 1 2034 with ID1 2004 and associated Body1 v1 2012; and Body2 V3 2026 with ID1 2004 and associated Body1 v4 2016. Record Block 6 2102 is a modification of Record Block 2 2036, after the deletion of ID1 2004 and associated Body1 v2 2014. Body2 V3 2026 and Record Block 5 2042 remain unchanged as neither record block contains an entity to be deleted.

Example 1C

FIG. 22 illustrates Example 1C 2200. In particular, FIG. 22 (Example 1C) illustrates an update of the Record Block Index by Subroutine 4 (FIG. 19).

On the left of FIG. 22, is the pre-updated Record Block index, while on the left is the post-update Record Block index.

Example 1D

Figure 23:
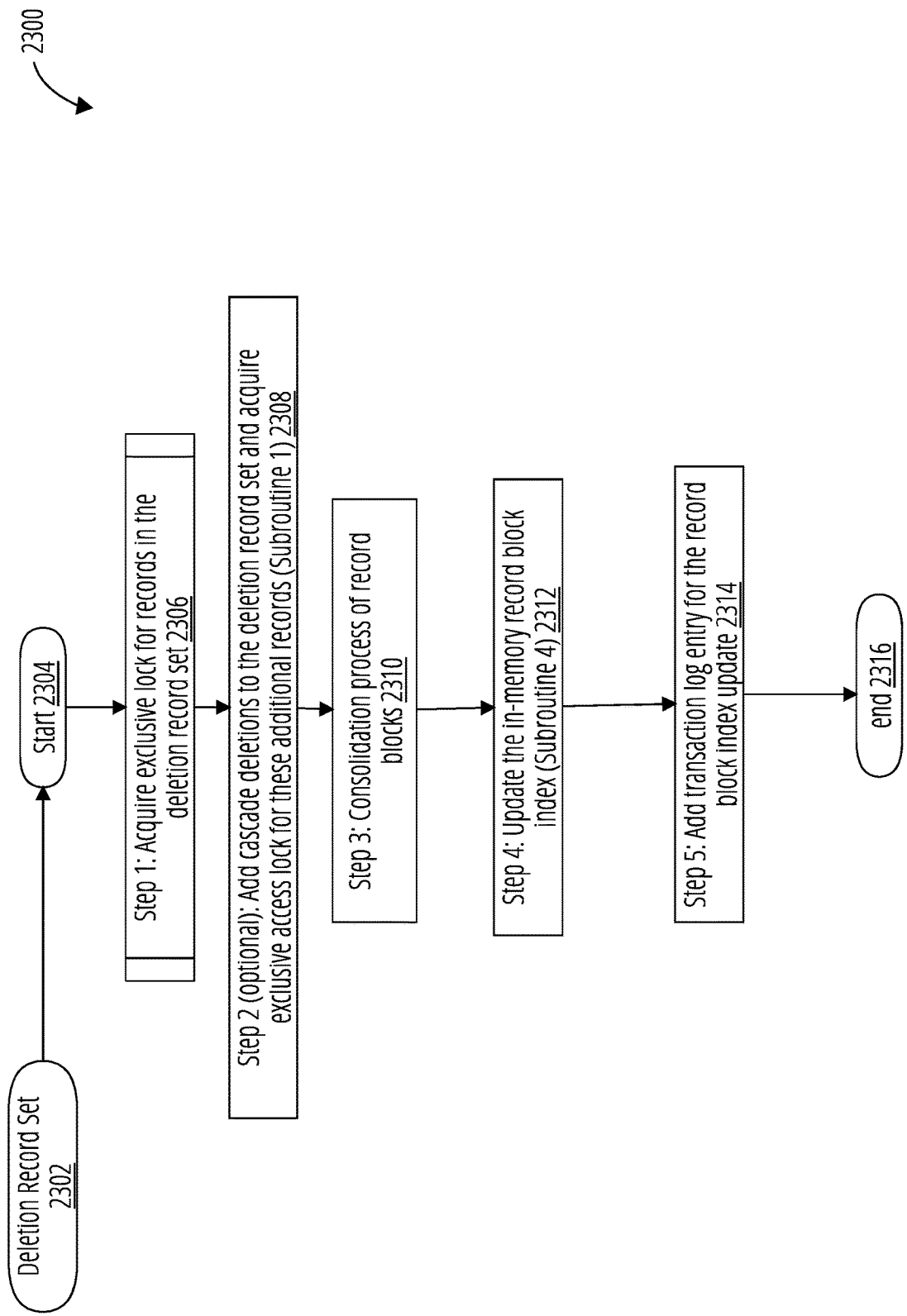
FIG. 23 illustrates a process overview in accordance with one embodiment.

An example transaction log entry for Example 1C shown in FIG. 22 is:
Delete record block 1 2204 from Table (T1, V1) 2206
Delete record block 2 2220 from Table (T1, V2) 2214
Delete record block 4 2224 from Table (T1, V4) 2218
Add record block 6 2234 to Table (T1, V2) 2228
Consolidation of Record Blocks FIG. 23 illustrates a process overview 2300 in accordance with one embodiment.

The input to this process is a deletion record set 2302, which is a set of records to be deleted, identified by the tables and IDs of the records. It can be input by a database user. The deletion set can be a list of records per table.

These records may be identified by querying the database for records that match certain conditions. In another method, a database user can execute an internal database procedure to identify records that match certain conditions.

In the process overview 2300, at step 1: acquire an exclusive lock for the records in the deletion record set. There are known implementations in the art of exclusive locks, including, for example:
(1) Mutual exclusion lock that is acquired by all readers and writers;
(2) Readers-writer lock, where the exclusive lock is the writer lock;
(3) Acquire and release may be no-ops if exclusive access to the records to be deleted is already known when the bulk deletion process is being run. For example, the database administrator can terminate all clients except the client that is running the bulk deletion process; and
(4) Other types of database access locks can be used to implement exclusive access.

The exclusive lock's granularity may be: database-wide, table-wide, per-group of records, or per-record.

Step 2, as shown in FIG. 23, is optional. To maintain referential integrity of the database, it may be desirable to additionally delete records that reference records in the deletion record set. This feature is known as cascade deletion, and is described in Subroutine 1 (see FIG. 15) which describes how to compute the records that should be cascade deleted, and add them to the deletion record set.

Step 3, as shown in FIG. 23, is a consolidation process of records at block 2310. This consolidation process is further described in FIG. 25-FIG. 31.

Step 4 (block 2312) is executed after completion of Step 5. Step 4 replaces the pre-delete record block set for each (table, version) with the corresponding post-delete record block set in the record block index. This is described in Subroutine 4 (FIG. 19).

At Step 5 (block 2314), add transaction log entry for the record block index update. This appends an entry to the transaction log that describes the record blocks to be removed and added to the record block index. See Example 1d) above for an example.

Figure 24:
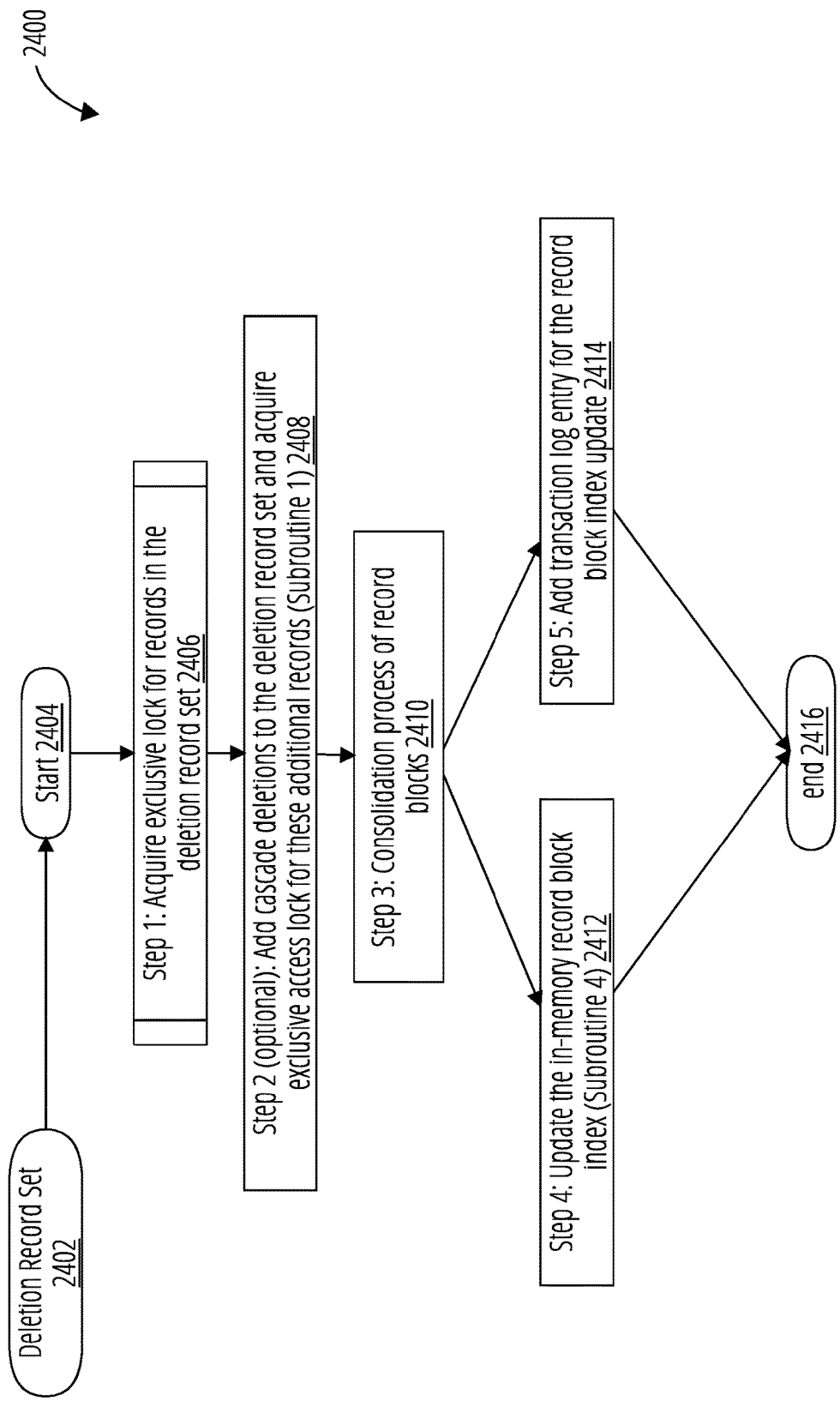
FIG. 24 illustrates a process overview in accordance with one embodiment.

Steps 4 and 5 can be executed in parallel, as shown in FIG. 24. The process ends at 2316 when all steps have been completed.

FIG. 24 illustrates a process overview 2400 in accordance with one embodiment.

The input to this process is a deletion record set 2402, which is a set of records to be deleted, identified by the tables and IDs of the records. It can be input by a database user. The deletion set can be a list of records per table.

These records may be identified by querying the database for records that match certain conditions. In another method, a database user can execute an internal database procedure to identify records that match certain conditions.

In the process overview 2400, at step 1: acquire an exclusive lock for the records in the deletion record set. There are known implementations in the art of exclusive locks, including, for example:
(1) Mutual exclusion lock that is acquired by all readers and writers;
(2) Readers-writer lock, where the exclusive lock is the writer lock;
(3) Acquire and release may be no-ops if exclusive access to the records to be deleted is already known when the bulk deletion process is being run. For example, the database administrator can terminate all clients except the client that is running the bulk deletion process; and
(4) Other types of database access locks can be used to implement exclusive access.

The exclusive lock's granularity may be: database-wide, table-wide, per-group of records, or per-record.

Step 2, as shown in FIG. 24, is optional. To maintain referential integrity of the database, it may be desirable to additionally delete records that reference records in the deletion record set. This feature is known as cascade deletion, and is further described in Subroutine 1 (see FIG. 15) which describes how to compute the records that should be cascade deleted, and add them to the deletion record set.

Step 3, as shown in FIG. 24, is a consolidation process of records at block 2310. This consolidation process is further described in FIG. 25-FIG. 31.

Step 4 block 2412) is executed after completion of Step 5. Step 4 replaces the pre-delete record block set for each (table, version) with the corresponding post-delete record block set in the record block index. This is described in Subroutine 4 (FIG. 19).

At step 5 (block 2414), executed in parallel with Step 4, add transaction log entry for the record block index update. This appends an entry to the transaction log that describes the record blocks to be removed and added to the record block index. See Example 1d) above for an example. The process ends when all steps have been completed at 2416.

Figure 25:
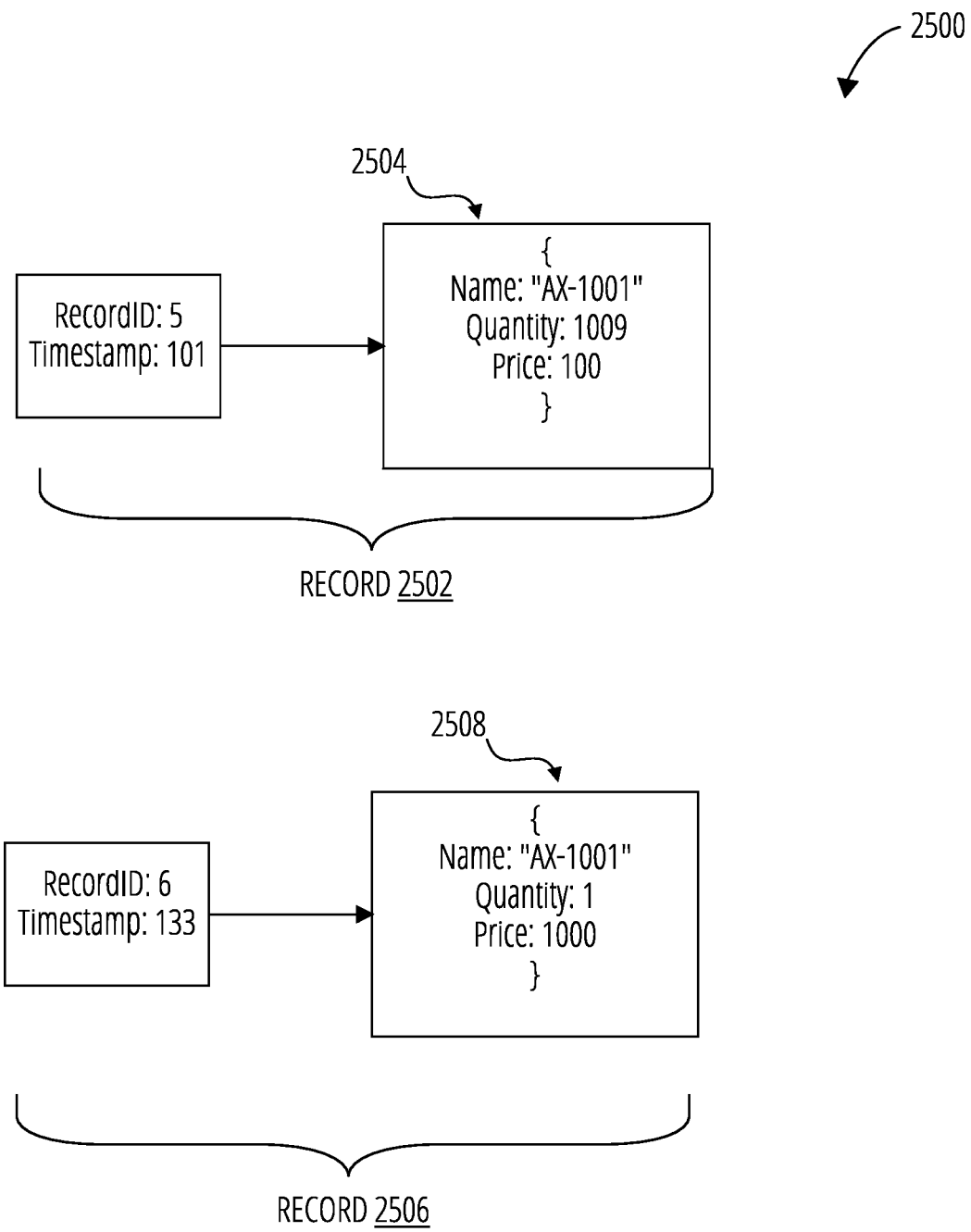
FIG. 25 illustrates records in accordance with one embodiment.

FIG. 25 illustrates records 2500, on disk, in accordance with one embodiment. In FIG. 25, record 2502 has a Record ID of 5, and a Timestamp of 101. Record 2502 contains three fields in body 2504: name, quantity and price. The value of the name field in record 2502 is "AX-1001"; the value of the quantity field in record 2502 is 1009; and the value of the price field in record 2502 is 100. Similarly, record 2506 contains three fields: name, quantity and price in body 2508. The value of the name field in record 2506 is "AX-1001"; the value of the quantity field in record 2506 is 1; and the value of the price field in record 2506 is 1000.

Figure 26:
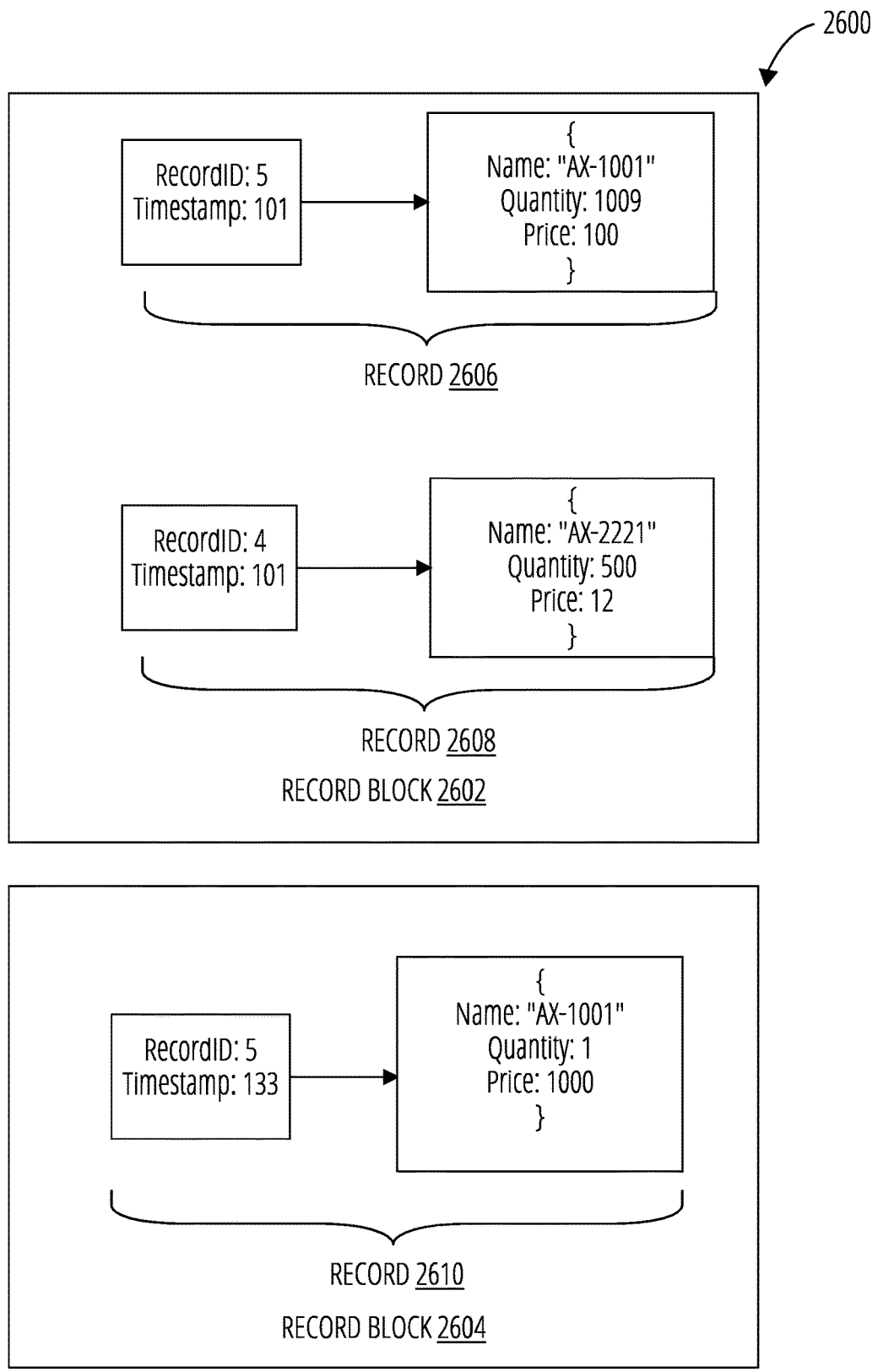
FIG. 26 illustrates record blocks in accordance with one embodiment.

FIG. 26 illustrates record blocks 2600 in accordance with one embodiment. In FIG. 26, record block 2602 contains two records: record 2606 and record 2608. Record block 2604 contains one record: record 2610.

In FIG. 26, record 2606 has a Record ID of 5, and a Timestamp of 101. Record 2606 has the following values: a name field with value "AX-1001"; a quantity field with value 1009; and a price field with value 100. Similarly, record 2608 has a Record ID of 4, and a Timestamp of 101. Record 2606 has the following values: a name field with value "AX-2221"; a quantity field with value 500; and a price field with value 12. Finally, record 2610 has a Record ID of 5, and a Timestamp of 13; record 2610 has the following values: a name field with value "AX-1001"; a quantity field with value 1; and a price field with value 1000.

Figure 27:
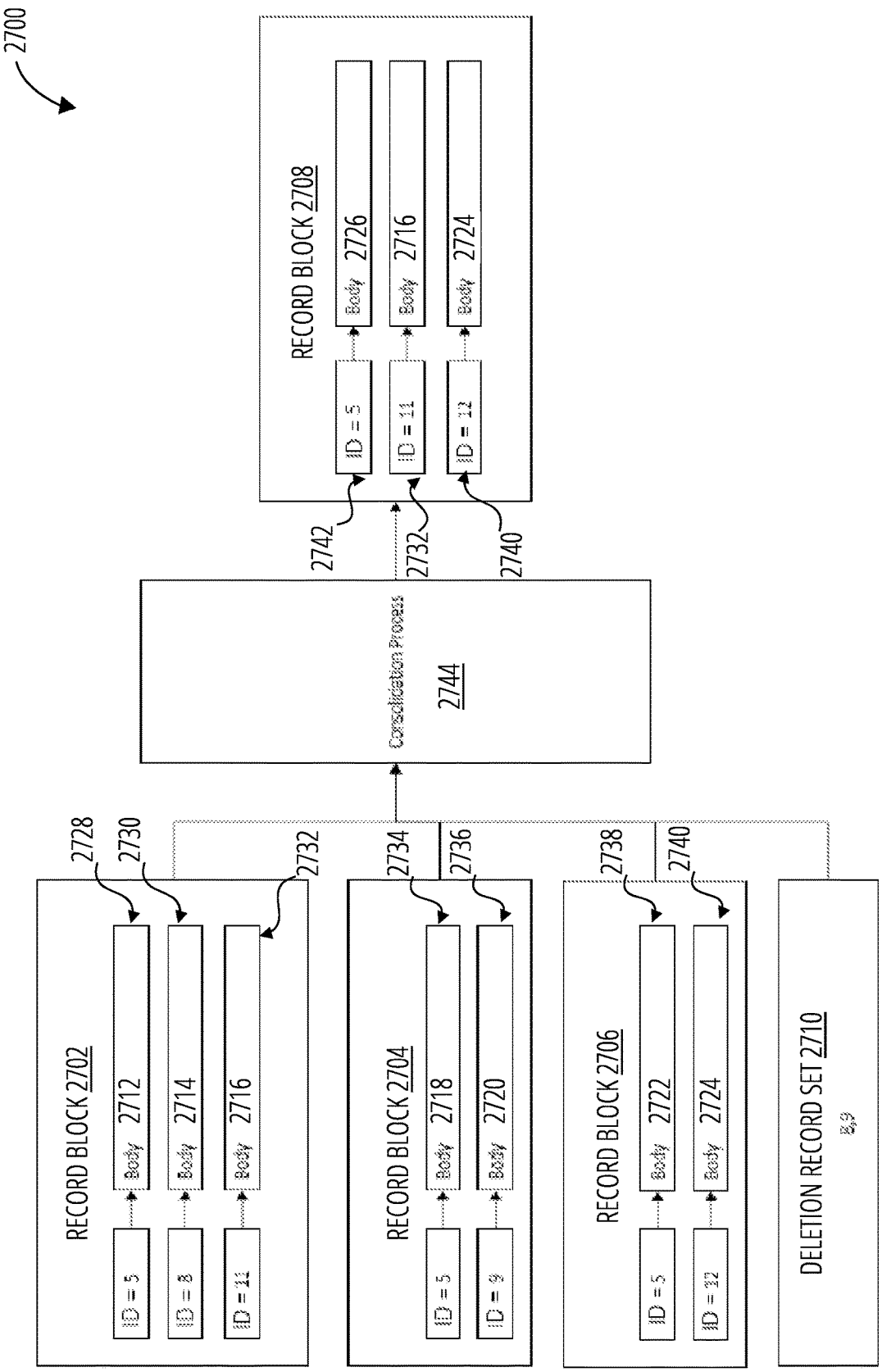
FIG. 27 illustrates consolidation of record blocks in accordance with one embodiment.

FIG. 27 illustrates record blocks consolidation 2700 in accordance with one embodiment.

In FIG. 27, there are three record blocks (record block 2702, record block 2704 and record block 2706) and a deletion record set 2710 that undergo consolidation process 2744 to provide record block 2708.

Record block 2702 contains three records: record 2728, record 2730 and 2732. Each record is as follows: record 2728 is identified with ID=5 and body 2712; record 2730 is identified with ID=8 and body 2714; and record 2732 is identified with ID=11 and body 2716.

Record block 2704 contains two records: record 2734 and record 2736. Each record is as follows: record 2734 is identified with ID=5 and body 2718; and record 2736 is identified with ID=9 and body 2720.

Record block 2706 contains two records: record 2738 and record 2444. Each record is as follows: record 2738 is identified with ID=5 and body 2722; and record 2740 is identified with ID=12 and body 2424. Note that while record 2728, 2732 and 2738 may each have the same ID (ID=5), their respective bodies may or not be the same.

Deletion record set 2710 indicates that records with ID=8 and ID=9 are to be deleted from the record blocks 2702, 2704 and 2706 that are input into consolidation process 2744.

Once the three record blocks 2702, 2704 and 2706 and deletion record set 2710 undergo consolidation process 2744, the result is record block 2708 that has three records: record 2742, record 2732 and body 2724. Record 2742 is identified with ID=5 and body 2726; record 2732 is identified with ID=11 and body 2716; and record 2732 is identified with ID=11 and body 2716. Consolidation process 2744 is described further in FIG. 28.

That is, prior to consolidation process 2744, there were a total of seven records (record 2728, record 2730, record 2732, record 2734, record 2736, record 2738 and record 2740) in the three record blocks (record block 2702, record block 2704, record block 2706). Consolidation process 2744 eliminates those records that are designated for deletion, and eliminates duplicated records. Thus record 2730 (with ID=8) and body 2720 (with ID=9) are deleted, while only one of records with ID=5 (record 2728, record 2734 and record 2734) remain, along with record 2732 (ID=11) and record 2740 (ID=12).

Figure 28:
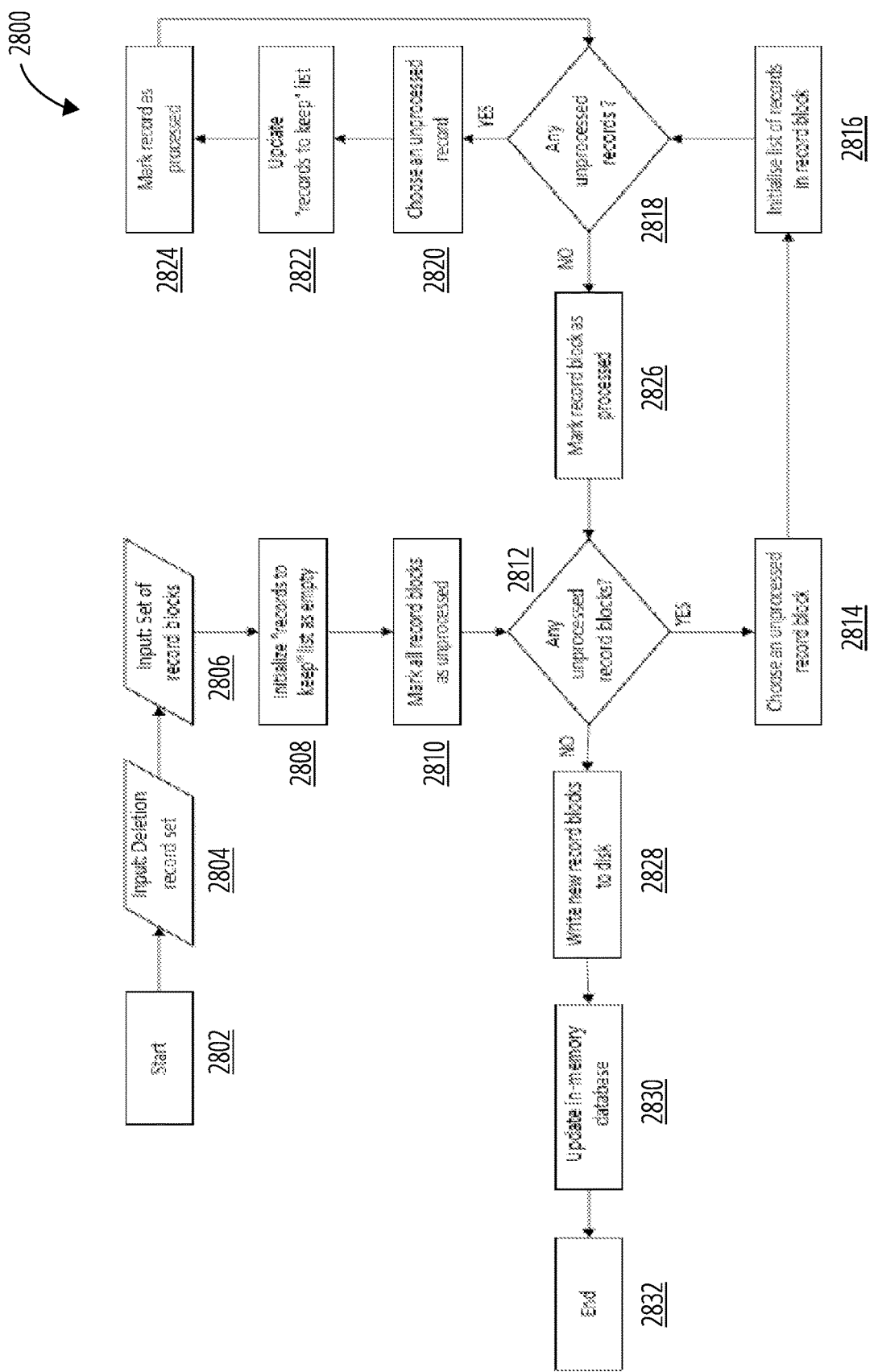
FIG. 28 illustrates a block diagram for a consolidation process in accordance with one embodiment.

FIG. 28 illustrates a block diagram 2800 for consolidation process 2744 (shown in FIG. 27) in accordance with one embodiment.

The process starts at 2802. There are two inputs: a deletion record set 2804 (for example, deletion record set 2710 in FIG. 27) and a set of record blocks 2806 (for example, record block 2702, record block 2704 and record block 2706 in FIG. 27).

The consolidation process will, in the end, compile a list of records that will be kept. Therefore, a "records to keep" list is initialized as empty at 2808. All of the record blocks are marked as unprocessed at 2810. At the first instance of decision block 2812, the answer is 'yes' to the question "any unprocessed record blocks?"

Figure 29:
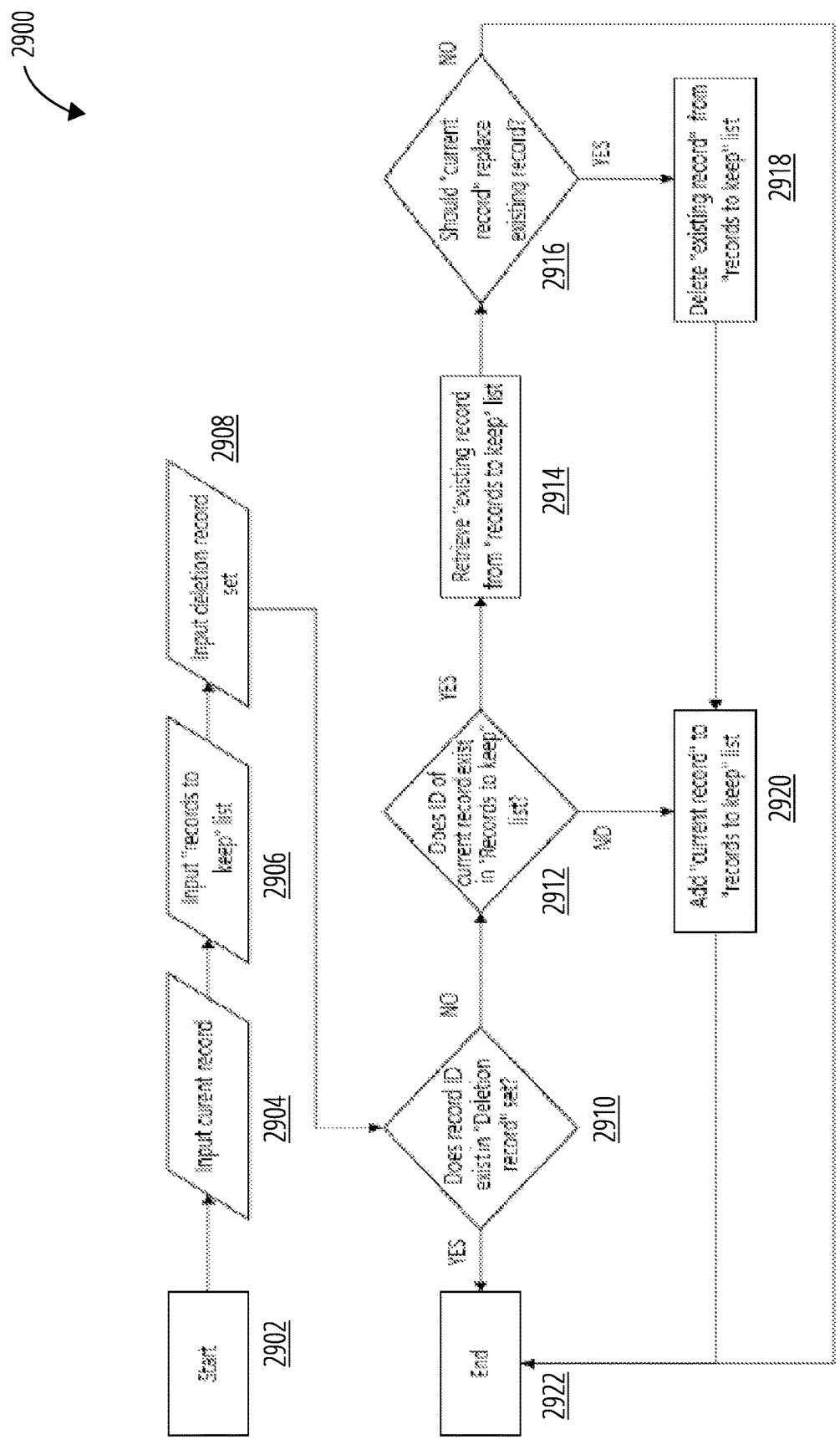
FIG. 29 illustrates a block diagram for updating a "record to keep" list in accordance with one embodiment.

An unprocessed record block is chosen at 2814. The list of records in the chosen record block is initialized at 2816. This list is different from the "records to keep" list that was initialized at 2808. At the first instance of decision block 2818, the answer is 'yes' to the question "any unprocessed records?" An unprocessed record is chosen at 2820, after which the "records to keep" list is updated at 2822 (FIG. 29 illustrates an embodiment of the updating process). The record is then marked as processed at 2824, after which further unprocessed records are processed by reverting to decision block 2818.

Figure 30:
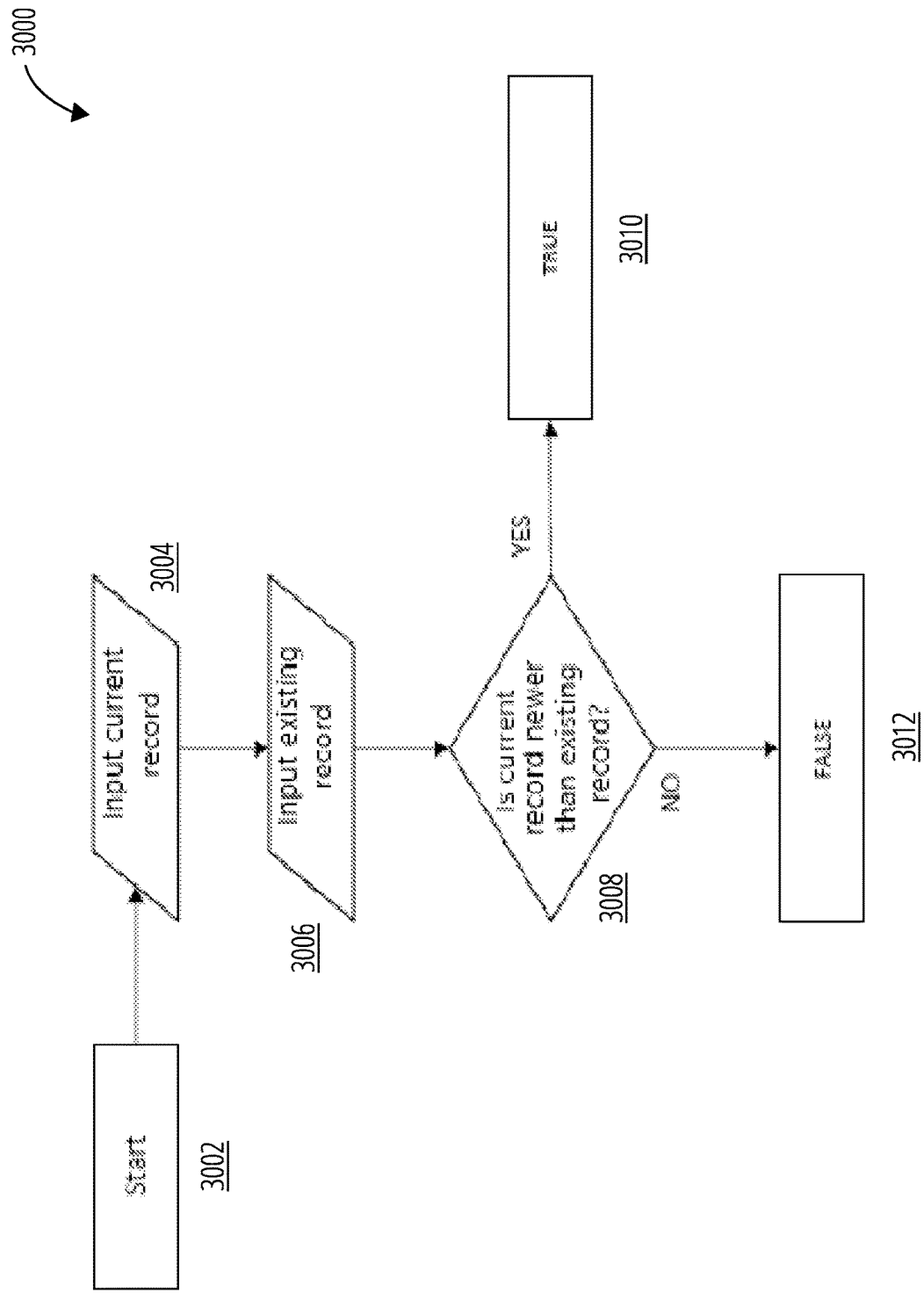
FIG. 30 illustrates a block diagram for a replacement criteria in accordance with one embodiment.
Figure 31:
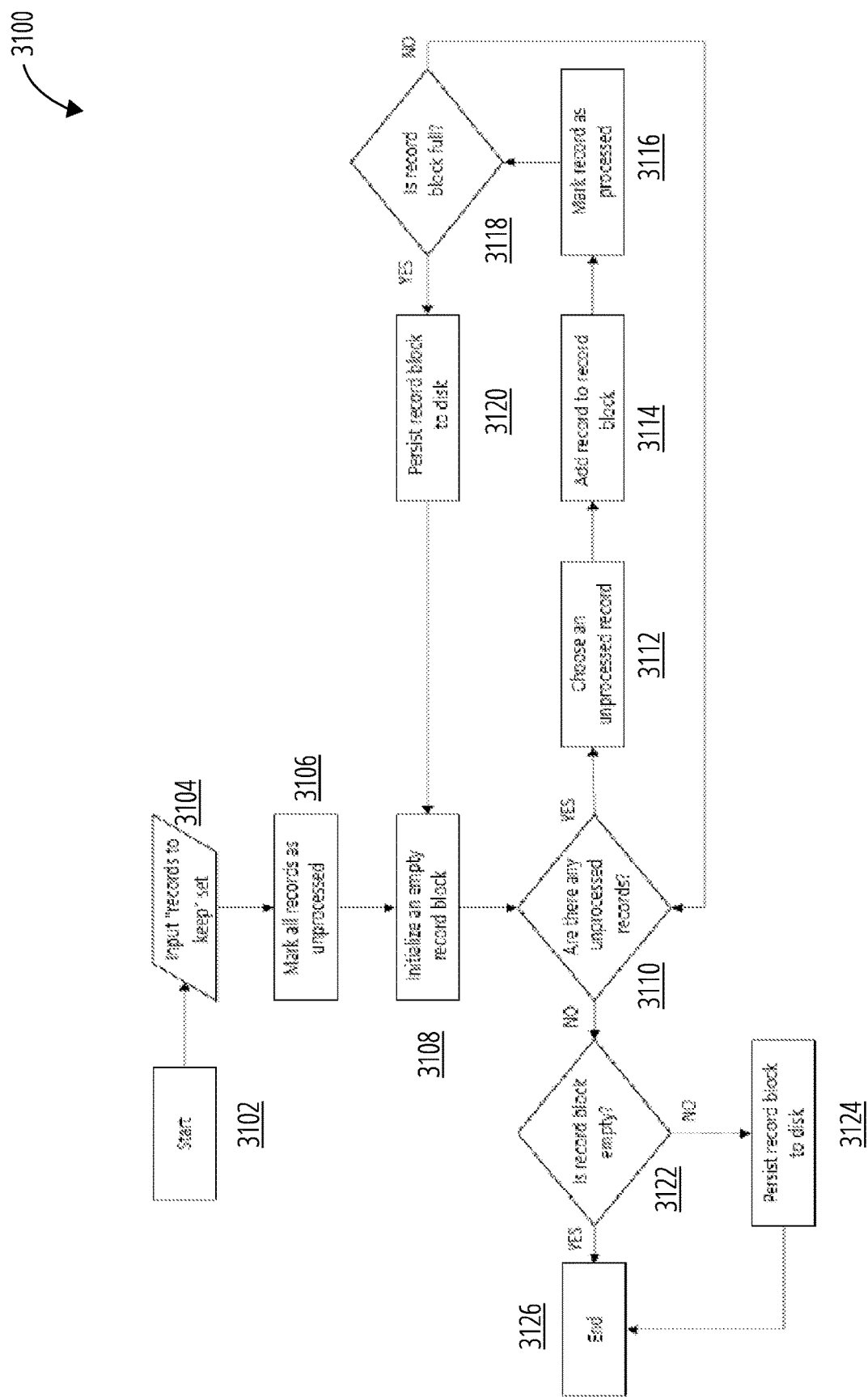
FIG. 31 illustrates a block diagram for writing one or more new record blocks to a disk, in accordance with one embodiment.

The loop 2818-2820-2822-2824-2818 is executed until there are no more records to process in the record block, and the record block is marked as processed at 2826. The process then checks to see if there are any remaining unprocessed record blocks at decision block 2812. If yes, then the procedure starting at 2814 is re-executed. If not, then new record blocks are written to disk at 2828 (an embodiment of the writing process is illustrated in FIG. 30). The in-memory database can then be updated at 2830 (an embodiment of the in-memory updating process is illustrated in FIG. 31). The process then ends at 2832.

As an example, the process described in FIG. 28 as applied to the record blocks in FIG. 27, proceeds as follows: the deletion record set 2710, and record blocks 2702, 2704 and 2706 are input, while a "records to keep" list is first set to empty at 2808. Record block 2702 is then processed first, by sequentially processing record 2728, record 2730 and record 2732; the "records to keep" list is updated while processing each record at 2822. After record block 2702 is processed, record block 2704 is processed by sequentially processing record 2734 and record 2736; the "records to keep" list is further updated while processing each record at 2822. After record block 2704 is processed, record block 2706 is processed by sequentially processing record 2738 and record 2740; the "records to keep" list is further updated while processing each record at 2822. Since record block 2706 is the last record block to be processed, the procedure shifts to 2828 where new record block 2708 is written to disk, followed by updating an in-memory database at 2830.

FIG. 29 illustrates a block diagram 2900 for updating a "record to keep" list in accordance with one embodiment. This is an embodiment of step 2822 in FIG. 28.

The input includes: the current record being processed (in a particular record block) at 2904, the current state of the "records to keep" list at 2906, and the deletion record set at 2908. At decision block 2910, the ID of the record (under processing) is checked against the list of record IDs in the deletion record set.

If the record ID is in the deletion record set ("yes" at, this means that this record is to be deleted, and will therefore, not be kept in the "records to keep" list. The program thus ends, for this particular record, at 2922.

On the other hand, if the record ID is not in the deletion record set ("no" at decision block 2910), then the record ID is checked against the current list of record IDs in the "records to keep" list at decision block 2912. If the answer is 'no', the current record is added to the "records to keep" list at 2920, and the procedure is complete (at 2922).

If the answer is 'yes' at decision block 2912, then the existing record (with the same ID as the ID of the record being processed) is retrieved from the "records to keep" list at 2914. The two records are compared, and a decision is made at decision block 2916 on which of the two records to keep in the "records to keep" list. This decision can be based on a variety of criteria; FIG. 30 further illustrates an embodiment of the decision-making process at decision block 2916.

If it is decided that the current record should replace the existing record in the "records to keep" list at decision block 2916 (i.e. Answer is 'yes'), then the existing record is deleted in the "records to keep" list at 2918, and the current record is added to the "records" to keep list at 2920. The procedure is thus complete and ends at 2922.

On the other hand, if it is decided that the current record should not replace the existing record in the "records to keep" list at decision block 2916 (i.e. Answer is 'no'), then the procedure is complete and ends at 2922.

The process of FIG. 29, as applied to a few of the records in the record blocks in FIG. 27, proceeds as follows.

As an example, record 2728 in record block 2702 is processed as follows. The current record 2728 (with ID=5), the current "records to keep" list and the deletion record set 2710 (with ID=8 or ID=9) are input respectively at 2904, 2906 and 2908. Since record 2728 is the first record to be processed, the "records to keep" list is empty. At decision block 2910, the ID of record 2728 (ID=5) is checked against the IDs in the deletion record set 2710 (ID=8 and ID=9). Since the ID of record 2728 does not exist in deletion record set 2710 (namely, ID=8), record 2728 will be added to the "records to keep" list—but first, it will be checked to see if a record ID with same record ID as record 2728 is in the current "records to keep" list at decision block 2912. Since the "records to keep" list is currently empty, there is no match and record 2728 is added to the "records to keep" list at 2920. This process ends at 2922, and the "records to keep list" has been updated to now include record 2728.

Next, record 2730 in record block 2702 is processed as follows. The current record 2730 (with ID=8), the current "records to keep" list and the deletion record set 2710 (with ID=8 and ID=9) are input respectively at 2904, 2906 and 2908. At decision block 2910, the ID of record 2730 (ID=8) is checked against the IDs in the deletion record set 2710 (ID=8 or ID=9). Since the ID of record 2730 does exist in deletion record set 2710 (namely, ID=8), record 2730 will not be added to the "records to keep" list, and the processing of record 2730 ends at 2922.

Next, record 2732 in record block 2702 is processed as follows. The current record 2730 (with ID=11), the current "records to keep" list (which now includes record 2728) and the deletion record set 2710 (with ID=8 and ID=9) are input respectively at 2904, 2906 and 2908. At decision block 2910, the ID of record 2732 (ID=11) is checked against the IDs in the deletion record set 2710 (ID=8 and ID=9). Since the ID of record 2732 does not exist in deletion record set 2710 (namely, ID=8), record 2732 will be added to the "records to keep" list—but first, it will be checked to see if a record ID with same record ID as record 2732 is in the current "records to keep" list at decision block 2912. Since the "records to keep" list currently lists record 2728 (with ID=5), there is no match and record 2732 is added to the "records to keep" list at 2920. This process ends at 2922, and the "records to keep list" has been updated to now include record 2728 (with ID=5) and record 2732 (with ID=11).

Next, record 2734 (with ID=5) in record block 2704 is processed as follows. The current record 2734 (with ID=5), the current "records to keep" list (which now includes record 2728 (with ID=5) and record 2732 (with ID=11)) and the deletion record set 2710 (with ID=8 and ID=9) are input respectively at 2904, 2906 and 2908. At decision block 2910, the ID of record 2734 (ID=5) is checked against the IDs in the deletion record set 2710 (ID=8 or ID=9). Since the ID of record 2734 does not exist in deletion record set 2710 (namely, ID=8), record 2734 will be added to the "records to keep" list—but first, it will be checked to see if a record ID with same record ID as record 2734 is in the current "records to keep" list at decision block 2912.

Since the "records to keep" list currently includes record 2728 (with ID=5) and record 2732 (ID=11), there is a match at decision block 2912, and the existing record 2728 (with=5) is retrieved from the "records to keep" list at 2914. Both records 2728 and 2734, with the same ID=5, are compared at decision block 2916. Depending on the criteria for replacement at decision block 2916, one of the two records, 2728 or 2734, will be placed in the "records to keep" list. If the replacement criteria is such that record 2728—which is already in the "records to keep" list—is kept (i.e. 'no' at decision block 2916), the procedure ends at 2922. On the other hand, if the replacement criteria is such that record 2734—which is not in the "records to keep" list—is kept (i.e. 'yes' at decision block 2916), then the existing record 2728 in the "records to keep" list is deleted at 2918, and the current record 2734 is added to the "records to keep" list at 2920. The "records to keep list" has been updated to now include record 2734 (with ID=5) and record 2732 (with ID=11).

The remaining records and record blocks in FIG. 27, are processed according to the block diagram in FIG. 29.

FIG. 30 illustrates a block diagram 3000 for a replacement criteria in accordance with one embodiment. This is an embodiment of decision block 2916 of FIG. 29.

In the embodiment shown in FIG. 30, the replacement criteria between two records with the same record ID is based on which record is newer (i.e. More recent). The current record being processed is input at 2764. The existing record in the "records to keep" list, which has the same ID, is input at 3006. The two records are compared at decision block 3008, to see which record is more recent. This can be accomplished by comparting the time stamp of each record. If the current record is newer, then the current record is chosen, and the "records to keep" list is updated. If the existing record is newer, then the existing record is chosen, and the "records to keep" list is not updated.

As an example, when the replacement criteria of block diagram 3000 is applied to record 2606 (ID=5, timestamp=101) and record 2610 (ID=5, timestamp=133), the procedure is as follows. Assuming that the "records to keep" list already includes record 2606 (timestamp=101). When record 2610 (timestamp=133) is processed, decision block 3008 compares the timestamps of both records and evaluates that record 2610 has the later timestamp. Thus record 2610 is the newer record, and record 2610 replaces record 2606 in the "records to keep" list.

While FIG. 30 illustrates an embodiment of a replacement criteria based on timestamps, other criteria are possible. Non-limiting examples include retaining a record based on record size comparison (e.g. Keeping a record, either because it is smaller or larger than an existing record), timestamp comparison (e.g. Keeping a record because it is older than an existing record), and so on.

FIG. 31 illustrates a block diagram 3100 for writing one or more new record blocks to a disk, in accordance with one embodiment. This is an embodiment of step 2828 of FIG. 28.

At this juncture (step 2828 of FIG. 28), the "records to keep" list is complete, which is input at 3104, All of the records in this "records to keep" set are marked as unprocessed at 3106. An empty record block is then initialized at 3108. At the first instance of decision block 3110, every record in the "records to keep" list is unprocessed, and an unprocessed record is selected at 3112. This record is added to the empty record block at 3114, and the record is now marked as processed at 3116. The record block is no longer empty. Before going on to the next record in the "records to keep" list, there is an option to check if the record block is full at decision block 3118.

Figure 32:
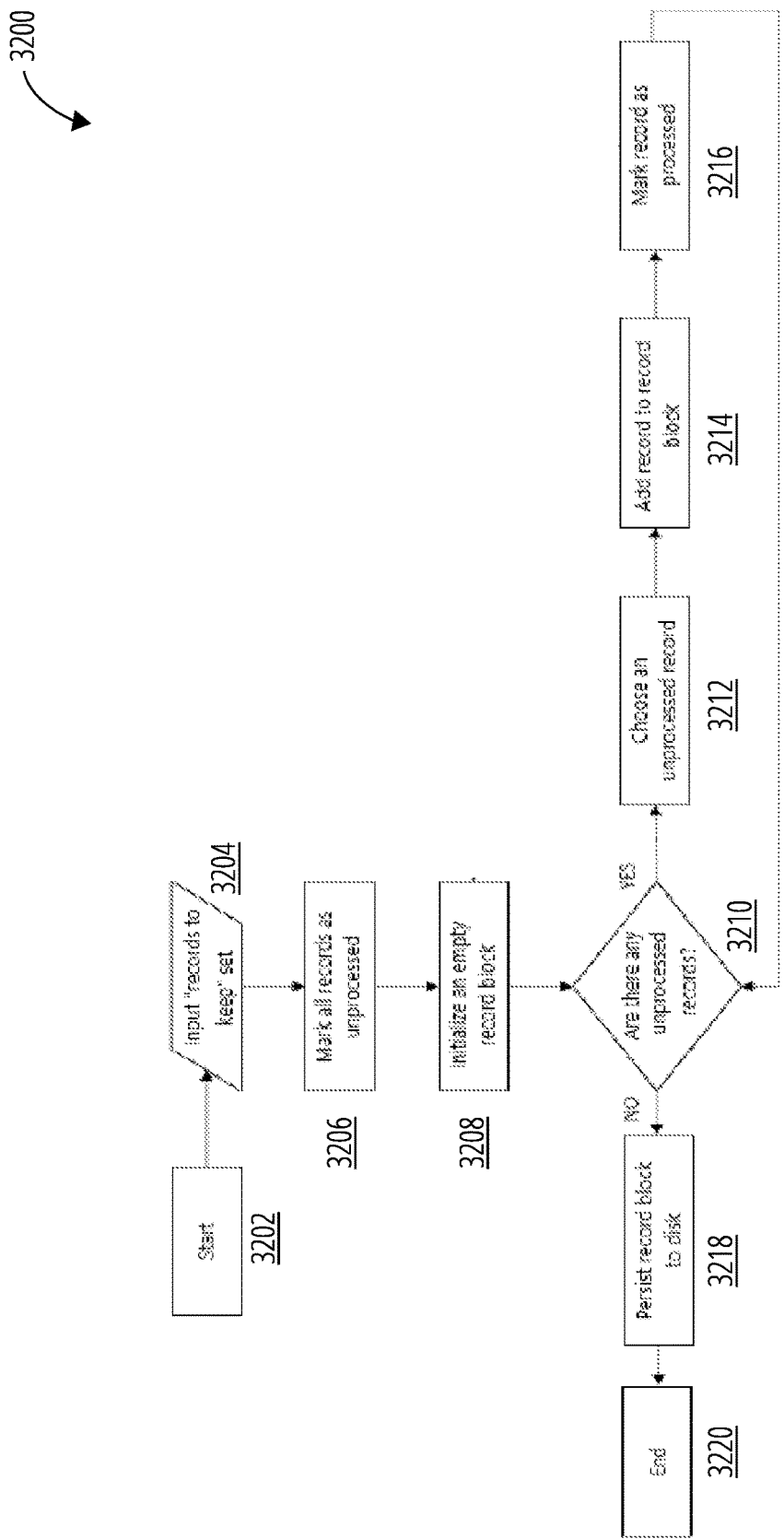
FIG. 32 illustrates a block diagram for writing one or more new record blocks to a disk, in accordance with one embodiment.

If the answer is 'yes' at decision block 3118, then the full record block is persisted to a disk at 3120, and a new empty record block is initialized at 3108. The procedure is repeated to process the next unprocessed record at decision block 3110. If the answer is 'no' at decision block 3118, then the procedure is repeated to process the next unprocessed record at decision block 3110. A criteria for the record block size can be set by the user. Alternatively, the user may decide that all of the records will be written to one record block alone, and decision block 3118 can be eliminated altogether. This variation is shown in FIG. 32.

Once all records in the "records to keep" list are processed ('no' at decision block 3110), the current record block is checked to see if it is empty at decision block 3122. If it is ('yes'), then the procedure ends at 3126. If it is not empty ('no' at decision block 3122), the resulting record block is persisted to the disk at 3124, and the procedure ends at 3126.

The process of FIG. 31, as applied to the record blocks in FIG. 27, proceeds as follows. The "records to keep" list include record 2732 and record 2740, and one of records 2728, 2734 and 2738. The selected record with ID=5, depends on the selection criteria of records with identical IDs. In one embodiment, where the selection criteria is the newest record, record 2738 (with a later timestamp, which is not shown) is selected. Therefore, the "records to keep" list contains records, 2732, 2738 and 2740, which is input at 3104. Each record is then marked as unprocessed at 3106, and an empty (new) record block 2708 is initialized.

The first record (record 2732) is chosen for processing at 3112 following decision block 3110. It is simply added to record block 2708 at 3114, and it is marked as processed at 3116. At decision block 3118, record block 2708 is checked to see if it is full, or still has space to take in more records. At this stage, record block 2708 includes only record 2732, and thus has more space ('no' at decision block 3118). The procedure returns to decision block 3110 to process the next unprocessed record, namely record 2738, which is added to record block 2708 at 3114. At decision block 3118, record block 2708 is once again checked to see if it is full. Since it has more space ('no' at decision block 3118) the procedure then processes the final unprocessed record, namely record 2740, which is added to record block 2706 at 3114.

At decision block 3118, record block 2706 is checked to see if it is full. If yes, then it is written to disk at 3120; another empty record block is initialized at 3108. Since there are no further records to process ('no' at decision block 3110), and the new record block is empty ('yes' at decision block 3122), the procedure ends at 3126, without the empty new record block being written to disk.

On the other hand, if record block 2706 is not full ('no' at decision block 3118), the next step is to check if there are any remaining unprocessed records at decision block 3110. Since there are none ('no' at decision block 3110), and record block 2706 is not empty ('no' at decision block 3122), record block 2706 is persisted to the disk at 3124, and procedure ends at FIG. 32 illustrates a block diagram 3200 for writing one or more new record blocks to a disk, in accordance with one embodiment. This is an embodiment of step 2828 of FIG. 28. Unlike the embodiment shown in FIG. 31, only one record block is used to contain all of the records in the "records to keep" list; this record is written to a disk.

At this juncture (step 2828 of FIG. 28), the "records to keep" list is complete, which is input at 3204, All of the records in this "records to keep" list are marked as unprocessed at 3206. An empty record block is then initialized at 3208. At the first instance of decision block 3210, every record in the "records to keep" list is unprocessed, and an unprocessed record is selected at 3212. This record is added to the empty record block at 3214, and the record is now marked as processed at 3216. The record block is no longer empty. All of the remaining records in the "records to keep" list are processed in a similar manner, until there are no more records to process ('no' at decision block 3210), and record bock is persisted to a disk at 3218. The process ends at 3220.

Figure 33:
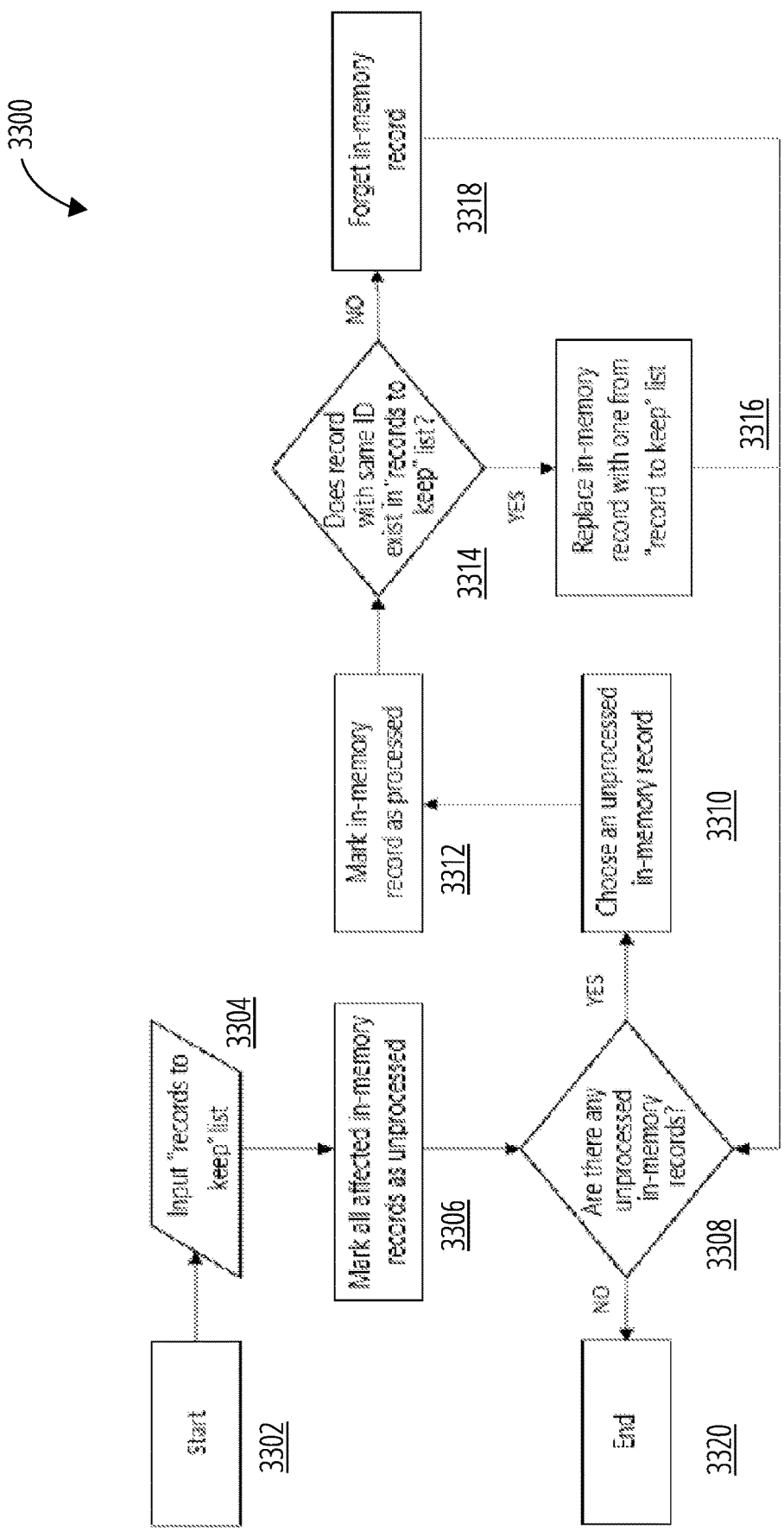
FIG. 33 illustrates a block diagram for updating an in-memory database, in accordance with one embodiment.

FIG. 33 illustrates a block diagram 3300 for updating an in-memory database, in accordance with one embodiment. This is an embodiment of step 2830 in FIG. 28.

The "records to keep" list is input at 3304. All of the effected in-memory records are marked as unprocessed as 3306. "Affected" records refers to all the records in the original record blocks prior to consolidation. At the first instance of decision block 3308, an unprocessed in-memory record is chosen at 3310, after which it is marked as processed at 3312. At decision block 3314, the ID of the processed record is compared to the ID of each record in the "records to keep" list to see if there is a match.

If there is no match at decision block 3314, then in-memory record is forgotten at 3318, after which, either the next unprocessed in-memory record is processed ('yes' at decision block 3308) or all of the affected in-memory records have been processed ('no' at decision block 3308) and the program ends at 3320. There are a variety of ways in which the in-memory record can be forgotten at 3318. One embodiment is to simply delete that in-memory record. There can be other ways to forget the in-memory record, which can be designed by a user.

If there is a match at decision block 3314 (i.e. "yes"), then in-memory record replaced with the record (with the same ID) from the "records to keep" list at 3310. Afterwards, the next affected in-memory record that has not been processed, is processed ('yes' at decision block 3308). If there remain no more affected in-memory records to be processed ('no' at decision block 3308), then the procedure ends at 3320.

As an example, when the embodiment of updating an in-memory database shown in block diagram 3300 is applied to the example shown in FIG. 27, procedure is as follows. At 3304, the "records to keep" list includes records 2732 (ID=11), 2740 (ID=12) and 2742 (ID=5). All of the in-memory records affected by consolidation process 2744 include the in-memory equivalent of each of the following records: record 2728 (ID=5), record 2730 (ID=8), record 2732 (ID=11), record 2734 (ID=5), record 2736 (ID=9), record 2738 (ID=5) and record 2740 (ID=12). Each of these affected in-memory records is marked as unprocessed at 3306, and each will be processed.

At the first instance of decision block 3308 ('yes'), an un-processed in-memory record from the list of all affected in-memory records is chosen at 3310. This can be, for example, the in-memory equivalent of record 2730 (ID=8), which is then marked as processed at 3312. The ID of this record ('8') is compared to the ID's of each record in the 'records to keep' list at decision block 3314. Since the ID of record 2730 is not found in the "records to keep" list ('no' at decision block 3314), this in-memory record is forgotten. As an example of being forgotten, the in-memory record can be deleted. The same type of analysis applies to the in-memory equivalent of record 2736 (ID=9), the ID of which ('9') is not found among the IDs of the records in the "records to keep" list. As such, this in-memory record (with ID=9) is forgotten.

For the remaining affected in-memory records, the answer is 'yes' at decision block 3314, and the in-memory record is placed with the corresponding record in the "record to keep" list. For example, for the in-memory record equivalent to record 2732 (ID=11), at 3316, it will remain the same, since it is being replaced by its identical self. The same applies to record 2740 (ID=12). On the other hand, the in-memory record equivalent to record 2728 (ID=5), at 3316, this in-memory record will be replaced by record 2742 (ID=5), which is in the "records to keep" list. The same applies to the in-memory equivalent of record 2734 (ID=5).

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for efficient consolidation of record blocks in a database, the method comprising:

receiving, by a processor, a deletion record set for bulk data deletion from the database identified by executing an internal database procedure including querying an in-memory representation of the database for records that match certain conditions, and a set of record blocks, each record block comprising a set of records, wherein the bulk data deletion is performed without taking the database offline;

acquiring, by the processor, an exclusive lock for one or more of the records in the deletion record set, wherein the record block index has an access control mechanism which enables an atomic update of its contents;

consolidating, by the processor, one or more of the record blocks of the set of record blocks, wherein consolidating the one or more record blocks comprises processing, by the processor, each of the record blocks to determine records to keep and updating, by the processor, a list of records to keep, when processing each record the set of record blocks;

replacing, by the processor, existing records with current record by comparing a time stamp of the current record with a time stamp of the existing record:

deleting, by the processor, the existing record from the list of records to keep:

adding, by the processor, the current record to the list of records to keep:

updating, by the processor, an in-memory record block index; and adding, by the processor, a transaction log entry for an updated record block index update, wherein the transaction log entry describes an ACID (atomic, consistent, isolated and durable) update to the database, wherein the updating the in-memory record block index and the adding transaction log entry for the undated record block index are performed in parallel.

2. The computer-implemented method of claim 1, wherein:

consolidating, by the processor, the one or more record blocks; and updating, by the processor, the in-memory record block index, are performed in parallel.

3. The computer-implemented method of claim 1, wherein consolidating the one or more record blocks comprises:

writing, by the processor, one or more new record blocks to a disk after processing each record in each set of record blocks; and updating, by the processor, an in-memory database.

4. The computer-implemented method of claim 3, wherein updating the list of records to keep comprises:

receiving, by the processor, a current record and the deletion record set; where a record ID of the current record is not in the list of records to keep:

adding, by the processor, the current record to the list of records to keep; and:

where the record ID of the current record is in the list of records to keep:

retrieving, by the processor, an existing record with a record ID that is identical to the record ID of the current record, from the list of records to keep; and where the current record replaces the existing record according to a replacement criteria:

deleting, by the processor, the existing record from the list of records to keep; and adding, by the processor, the current record to the list of records to keep.

5. The computer-implemented method of claim 4, wherein the replacement criteria comprises comparing the time stamp of the current record with the time stamp of the existing record.

6. The computer-implemented method of claim 3, wherein writing the one or more new record blocks to the disk, comprises:
  containing, by the processor, each record block in the list of records to keep to one record block; or
  containing, by the processor, each record block in the list of records to keep to a plurality of record blocks.

7. A system comprising:
  a processor; and
  a memory storing instructions that, when executed by the processor, configure the system to:
  receive, by the processor, a deletion record set for bulk data deletion from a database identified by executing an internal database procedure including querying an in-memory representation of the database for records that match certain conditions, and a set of record blocks, each record block comprising a set of records, wherein the system is configured to perform the bulk data deletion without taking the database offline;
  acquire, by the processor, an exclusive lock for one or more records in the deletion record set, wherein the record block index has an access control mechanism which enables for an atomic update of its contents;
  consolidate, by the processor, one or more of the record blocks of the set of record blocks, wherein the instructions that configure the system to consolidate the one or more record blocks comprise instructions to process, by the processor, each of the record blocks to determine records to keep and update, by the processor, a list of records to keep, when processing each record the set of record blocks;
  replace, by the processor, existing records with current record by comparing a time stamp of the current record with a time stamp of the existing record:
  delete, by the processor, the existing record from the list of records to keep:
  add, by the processor, the current record to the list of records to keep;
  update, by the processor, an in-memory record block index, wherein the record block index has an access control mechanism which enables an atomic update of its contents; and
  add, by the processor, a transaction log entry for an updated record block index update, wherein the transaction log entry describes an ACID (atomic, consistent, isolated and durable) update to the database, wherein the update of the in-memory record block index and the adding of the transaction log entry for the updated record block index are performed in parallel.

8. The system of claim 7, wherein the memory storing the instructions that, when executed by the processor, further configure the system to:
  consolidate, by the processor, the one or more record blocks; and update, by the processor, the in-memory record block index, in parallel.

9. The system of claim 7, wherein when consolidating the one or more record blocks, the memory storing the instructions that, when executed by the processor, further configure the system to:
  write, by the processor, one or more new record blocks to disk after processing each record in each set of record blocks; and
  update, by the processor, an in-memory database.

10. The system of claim 9, wherein when updating the list of records to keep, the memory storing the instructions that, when executed by the processor, further configure the system to:
  receive, by the processor, a current record and the deletion record set; where a record ID of the current record is not in the list of records to keep:
  add, by the processor, the current record to the list of records to keep; and:
  where the record ID of the current record is in the list of records to keep:
  retrieve, by the processor, an existing record with a record ID that is identical to the record ID of the current record, from the list of records to keep; and
  where the current record replaces the existing record according to a replacement criteria:
  delete, by the processor, the existing record from the list of records to keep; and
  add, by the processor, the current record to the list of records to keep.

11. The system of claim 10, wherein the replacement criteria comprises comparing the time stamp of the current record with the time stamp of the existing record.

12. The system of claim 9, wherein when writing the one or more new record blocks to the disk, the memory storing the instructions that, when executed by the processor, further configure the system to:
  contain, by the processor, each record block in the list of records to keep to one record block; or
  contain, by the processor, each record block in the list of records to keep to a plurality of record blocks.

13. A non-transitory computer-readable storage medium, the computer-readable storage medium including instructions that when executed by a computer, cause the computer to:
  receive, by a processor, a deletion record set for bulk data deletion from a database identified by executing an internal database procedure including querying an in-memory representation of the database for records that match certain conditions and a set of record blocks, each record block comprising a set of records;
  acquire, by the processor, an exclusive lock for one or more of the records in the deletion record set, wherein the record block index has an access control mechanism which enables an atomic update of its contents;
  consolidate, by the processor, one or more of the record blocks of the set of record blocks, wherein the instructions that configure the computer to consolidate the one or more record blocks comprise instructions to process, by the processor, each of the record blocks to determine records to keep and update, by the processor, a list of records to keep, when processing each record the set of record blocks;
  replace, by the processor, existing records with current record by comparing a time stamp of the current record with a time stamp of the existing record:
  delete, by the processor, the existing record from the list of records to keep;
  add, by the processor, the current record to the list of records to keep:
  update, by the processor, an in-memory record block index; and add, by the processor, a transaction log entry for an updated record block index update, wherein the transaction log entry describes an ACID (atomic, consistent, isolated and durable) update to the database, wherein the update of the in-memory record block index and the adding of the transaction log entry for the updated record block index are performed in parallel.

14. The computer-readable storage medium of claim 13, wherein the computer-readable storage medium including instructions that when executed by a computer, further cause the computer to:

consolidate, by the processor, the one or more record blocks; and update, by the processor, the in-memory record block index, in parallel.

15. The computer-readable storage medium of claim 13, wherein when consolidating the one or more record blocks, the computer-readable storage medium including instructions that when executed by the computer, further cause the computer to:

write, by the processor, one or more new record blocks to disk after processing each record in each set of record blocks; and update, by the processor, an in-memory database.

16. The computer-readable storage medium of claim 15, wherein when updating the list of records to keep, the computer-readable storage medium including instructions that when executed by the computer, further cause the computer to:

receive, by the processor, a current record and the deletion record set; where a record ID of the current record is not in the list of records to keep:
add, by the processor, the current record to the list of records to keep; and:
where the record ID of the current record is in the list of records to keep:
retrieve, by the processor, an existing record with a record ID that is identical to the record ID of the current record, from the list of records to keep; and
where the current record replaces the existing record according to a replacement criteria:
delete, by the processor, the existing record from the list of records to keep; and
add, by the processor, the current record to the list of records to keep.

17. The computer-readable storage medium of claim 16, wherein the replacement criteria comprises comparing the time stamp of the current record with the time stamp of the existing record.

18. The computer-readable storage medium of claim 15, wherein when writing the one or more new record blocks to the disk, the computer-readable storage medium including the instructions that when executed by the computer, further cause the computer to:

contain, by the processor, each record block in the list of records to keep to one record block; or
contain, by the processor, each record block in the list of records to keep to a plurality of record blocks.

\* \* \* \* \*